US009715505B1

(12) United States Patent
Mondal

(10) Patent No.: US 9,715,505 B1
(45) Date of Patent: Jul. 25, 2017

(54) METHOD AND SYSTEM FOR MAINTAINING PERSISTENT LIVE SEGMENT RECORDS FOR GARBAGE COLLECTION

(71) Applicant: EMC Corporation, Hopkinton, MA (US)

(72) Inventor: Shishir Mondal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 238 days.

(21) Appl. No.: 14/501,911

(22) Filed: Sep. 30, 2014

(51) Int. Cl.
*G06F 17/30* (2006.01)

(52) U.S. Cl.
CPC .............................. *G06F 17/30117* (2013.01)

(58) Field of Classification Search
CPC ....... G06F 2212/702; G06F 2212/7205; G06F 12/0253; G06F 12/0269; G06F 12/0276; G06F 17/30117
USPC ......... 707/814, 817, 813, 693, 800, 999.204
See application file for complete search history.

(56) References Cited

U.S. PATENT DOCUMENTS

| | | | | |
|---|---|---|---|---|
| 4,037,215 A | * | 7/1977 | Birney | G06F 12/0292 711/164 |
| 4,121,286 A | * | 10/1978 | Venton | G06F 9/468 |
| 5,053,951 A | * | 10/1991 | Nusinov | G06F 12/1036 711/206 |
| 5,093,779 A | * | 3/1992 | Sakurai | G06F 17/30955 707/797 |
| 5,551,003 A | * | 8/1996 | Mattson | G06F 3/0601 711/112 |
| 5,560,003 A | * | 9/1996 | Nilsen | G06F 12/0269 |
| 5,799,324 A | * | 8/1998 | McNutt | G06F 3/061 |
| 6,151,685 A | * | 11/2000 | Li | G06F 11/1435 711/114 |
| 6,324,631 B1 | * | 11/2001 | Kuiper | G06F 12/023 711/159 |
| 6,763,440 B1 | * | 7/2004 | Traversat | G06F 12/0276 707/999.202 |
| 7,120,750 B1 | * | 10/2006 | Seidl | G06F 12/0269 707/999.202 |
| 7,287,131 B1 | * | 10/2007 | Martin | G06F 17/30949 707/999.101 |
| 7,305,424 B2 | * | 12/2007 | Chen | G06F 11/1435 |
| 7,424,498 B1 | * | 9/2008 | Patterson | G06F 12/0253 |

(Continued)

*Primary Examiner* — Mohammed R Uddin
(74) *Attorney, Agent, or Firm* — Blakely, Sokoloff, Taylor & Zafman LLP

(57) ABSTRACT

A garbage collector scans containers of a storage system, each container containing a plurality of segments referenced by files of the storage system. For each of the containers being scanned constructing a working live segment record (LSR) file in memory, including generating a container LSR for each of the containers being scanned in a sequential order according to container identifiers of the containers, generating segment LSRs associated with the container LSR, each of the segment LSRs corresponding to one of the segments contained in the container, and for each of the segments contained in the container, indicating in a corresponding segment LSR whether the segment is a live segment. The segment LSRs of each container LSR of the working LSR file are translated from the memory into a persistent LSR for each of the containers in a persistent LSR file stored a persistent storage.

24 Claims, 22 Drawing Sheets

(56) References Cited

U.S. PATENT DOCUMENTS

| | | | | |
|---|---|---|---|---|
| 7,469,324 | B2* | 12/2008 | Tene | G06F 12/0269 |
| | | | | 707/999.202 |
| 8,028,009 | B1* | 9/2011 | Patterson | G06F 12/0269 |
| | | | | 707/649 |
| 8,073,883 | B2* | 12/2011 | Carmody | G06F 9/30003 |
| | | | | 707/813 |
| 8,589,447 | B1* | 11/2013 | Grunwald | G06F 17/30088 |
| | | | | 707/638 |
| 9,396,202 | B1* | 7/2016 | Drobychev | G06F 17/30153 |
| 9,424,285 | B1* | 8/2016 | Condict | G06F 17/30303 |
| 2003/0169920 | A1* | 9/2003 | Thomas | G06F 12/0269 |
| | | | | 382/162 |
| 2007/0162515 | A1* | 7/2007 | Sarma | G06F 17/30067 |
| 2007/0214194 | A1* | 9/2007 | Reuter | G06F 17/30067 |
| 2007/0214314 | A1* | 9/2007 | Reuter | G06F 3/0607 |
| | | | | 711/114 |
| 2008/0082590 | A1* | 4/2008 | Hamilton | G06F 17/30067 |
| 2008/0126842 | A1* | 5/2008 | Jacobson | G06F 11/1662 |
| | | | | 714/6.12 |
| 2012/0254174 | A1* | 10/2012 | Mitra | G06F 17/30159 |
| | | | | 707/737 |
| 2012/0254257 | A1* | 10/2012 | Mitra | G06F 17/30129 |
| | | | | 707/803 |
| 2013/0145076 | A1* | 6/2013 | Chiueh | G06F 11/1417 |
| | | | | 711/103 |
| 2013/0227246 | A1* | 8/2013 | Hirao | G06F 12/0246 |
| | | | | 711/206 |
| 2013/0282676 | A1* | 10/2013 | Wade | G06F 17/30156 |
| | | | | 707/692 |
| 2014/0156777 | A1* | 6/2014 | Subbiah | H04L 67/1097 |
| | | | | 709/213 |

* cited by examiner

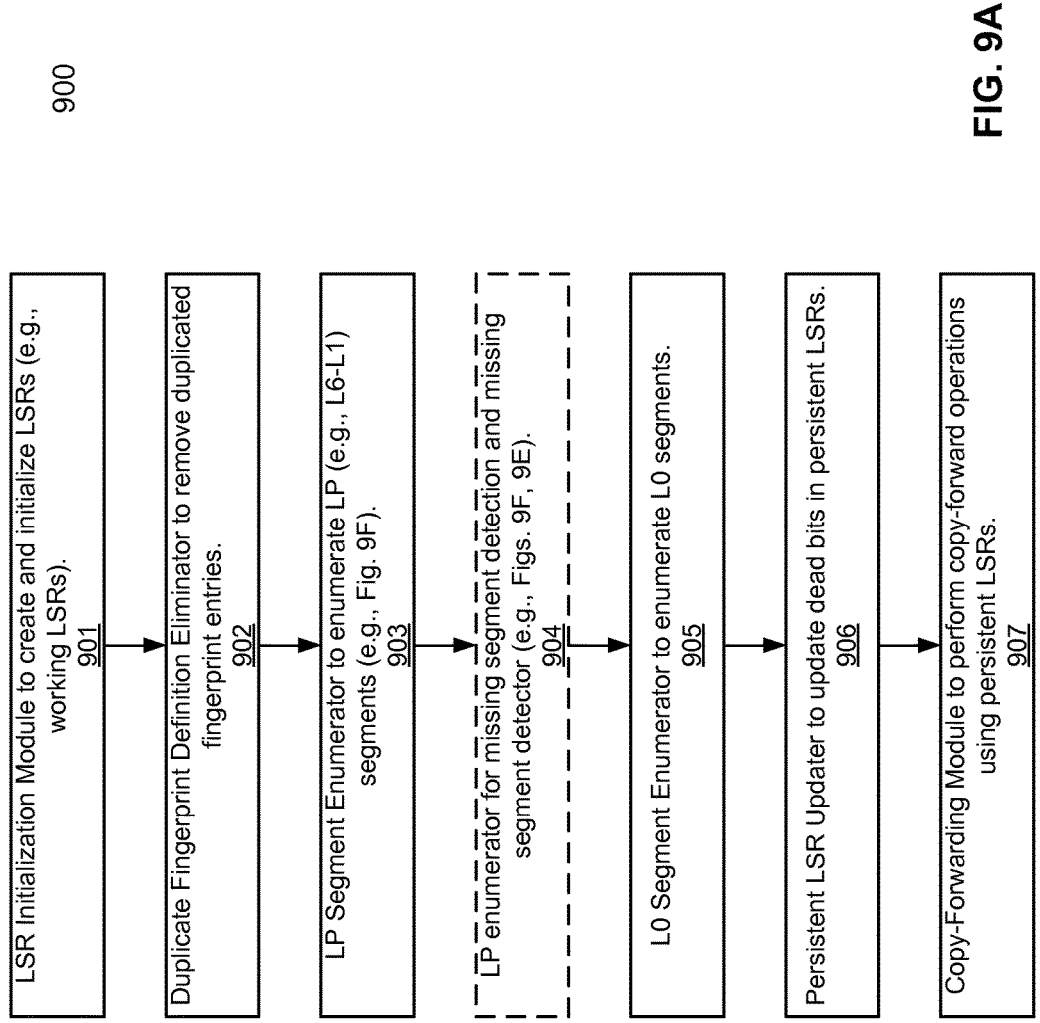

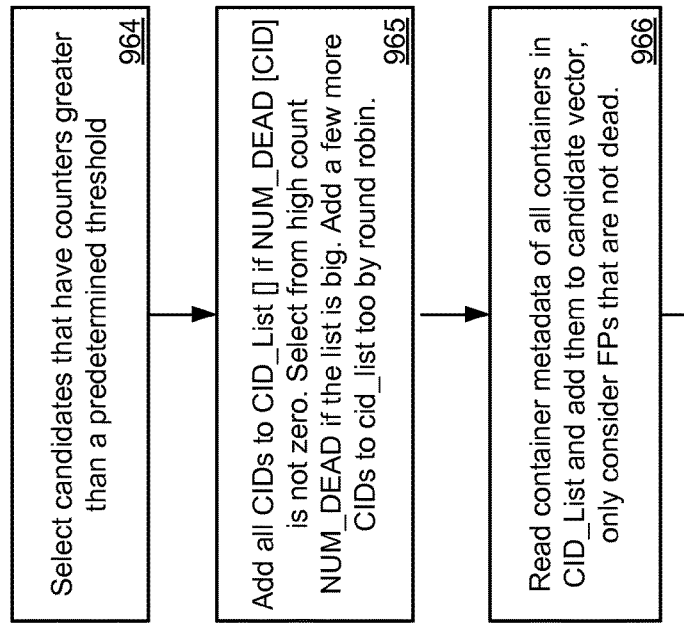

METHOD AND SYSTEM FOR MAINTAINING PERSISTENT LIVE SEGMENT RECORDS FOR GARBAGE COLLECTION

RELATED APPLICATIONS

This application is related to co-pending U.S. patent application Ser. No. 14/501,919 entitled "Method and System for Garbage Collection of Data Storage Systems using Live Segment Records," filed Sep. 30, 2014, which is incorporated by reference herein in its entirety.

FIELD OF THE INVENTION

Embodiments of the present invention relate generally to data storage systems. More particularly, embodiments of the invention relate to maintaining persistent live segment records for garbage collection of a data storage system.

BACKGROUND

In a deduplicated file system, such as Data Domain™ file system from EMC® Corporation, there are two components responsible to manage the files in the system. The first one is directory manager (DM), which is a hierarchical mapping from the path to the inode representing a file. The second one is content store (CS), which manages the content of the file. Each file has a content handle (CH) that is stored in the inode that is created by CS every time the file content changes. Each CH represents a file that is abstracted as a Merkle tree of segments. A file tree can have up to multiple levels, such as 7 levels: L0, . . . , L6. The L0 segments represent user data and are the leaves of the tree. The L6 is the root of the segment tree. Segments from L1 to L6 are referred to as metadata segments or Lp segments. They represent the metadata of a file associated with a file tree. An L1 segment is an array of L0 references. Similarly an L2 is an array of L1 references and so on.

A segment is considered live if it can be referenced by any live content in the file system. The file system packs the segments into containers which are written to disk in a log-structured manner. Each container is structured into sections. The first section is the metadata section and the following sections are referred to as compression regions (CRs). A CR is a set of compressed segments. In the metadata section there are all the references or fingerprints that identify the segments in the container. A field called content type is also stored therein, which describes the content of the container. For instance, it describes which compression algorithm has been used, which type of segments the container has (L0, . . . , L6), etc. There is a container manager that is responsible to maintain the log-structured container set and provide a mapping from container identifiers (CID) to block offset on disk. This mapping is entirely stored in memory. It also contains additional information, e.g., the content type of each container. Hence, it is easy to traverse the container manager metadata and filter containers to load from disk based on their content type. For instance, processing logic can traverse the entire container set and only read containers that have L6 segments in them.

A cleaning process (also referred to as a garbage collection process) of the file system is responsible for enumerating all live segments in the live content handles of the file system. A physical garbage collector does not understand the concept of file trees. It traverses all the files simultaneously using a breadth-first approach. Hence it cannot roll a per-file-tree checksum that would allow the garbage collector identifying whether any metadata segment is missed. A conventional garbage collection (GC) process scans all the LP containers in multiple times to perform few independent tasks, which is very memory and processing resource inefficient.

BRIEF DESCRIPTION OF THE DRAWINGS

Embodiments of the invention are illustrated by way of example and not limitation in the figures of the accompanying drawings in which like references indicate similar elements.

FIGS. 9A-9M are flow diagrams illustrating a process of performing garbage collection of a storage system using live segment records according to some other embodiments of the invention.

DETAILED DESCRIPTION

Figure 1:
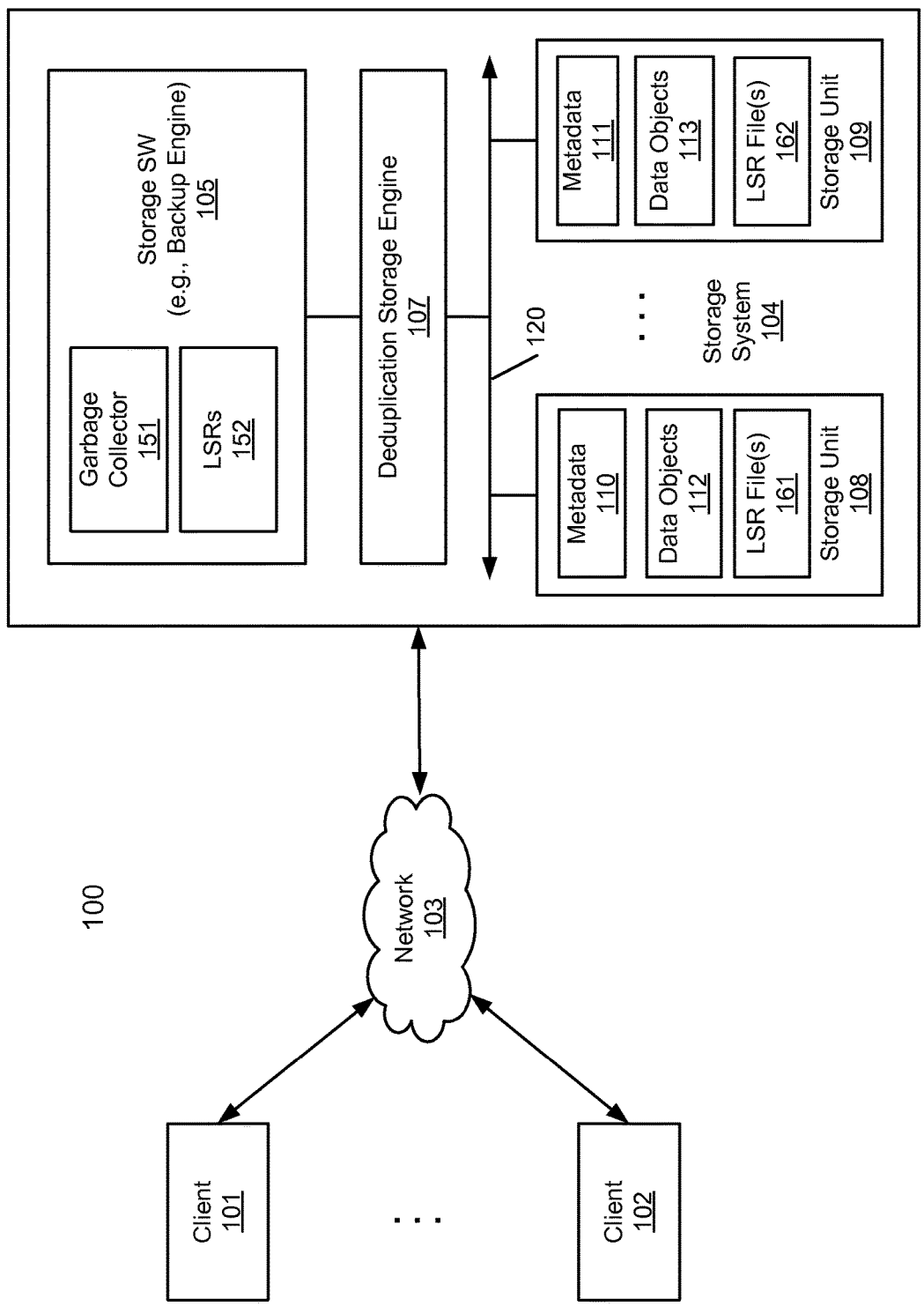
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a garbage collection process is performed based on physical segments of a file system namespace using live segment records (LSRs) that indicate whether segments representing one or more files of the file system are live segments (e.g., referenced by the files). In one embodiment, the LSRs may be maintained in one or more LSR files that are stored in a persistent storage associated with a storage system. Each LSR corresponding to one of many containers that contain the segments (e.g., deduplicated segments) of files of the storage system. Each file is represented by a file tree having segments of multiple levels in a hierarchical structure. Each segment that is not a leaf segment includes one or more references to one or more child segments Storage space of the dead segments indicated by the LSRs of the persistent LSR file may be subsequently reclaimed without having to scanning the corresponding containers of the storage system again.

In one embodiment, a set of containers of a storage system is scanned, where each of the containers contain therein segments of data associated with one or more files of a file system of the storage system. The containers may be scanned based on an order represented by container identifiers (IDs) to construct a list of container LSRs in a system memory, where each of the container LSRs is identified by the corresponding container ID. For each of the segments contained in a container, a segment LSR is generated to be associated with or contained within the corresponding container LSR. Each segment LSR includes a level field storing a value representing a level of the segment within a corresponding file tree and a live flag indicating whether the segment is a live segment. During the scanning, a level of each segment is determined and the level field of the corresponding segment LSR is populated.

After all of the segments in the set of containers have been populated in their respective segment LSRs, according to one embodiment, a namespace of the file system is traversed to determine whether the segments of the containers in the set are live segments. The namespace of the file system is traversed in a level-by-level manner based on the segment LSRs, for example, starting from the root level or top level (e.g., content handles) and ending at the bottom level. For the segments that are alive, live flags of their respective segment LSRs are configured or set for such indications.

After all of the segments associated with the set of containers have been traversed and indicated in their respective segment LSRs, according to one embodiment, at least the information of live flags of the segment LSRs is then translated into the persistent LSRs stored in a persistent LSR file in a persistent storage device of the storage system. Each of the persistent LSRs corresponds to one of the containers in the set. Each persistent LSR includes a dead bitmap having multiple bits, each bit corresponding to one of the segments contained in the corresponding container. A bit having a predetermined logical value indicates the corresponding segment is a dead segment.

After all of the live flags of the segment LSRs have been translated into persistent LSRs and stored in a persistent LSR file, according to one embodiment, the storage space of the dead segments indicated in the persistent LSRs is reclaimed, without having to scanning the containers again. In one embodiment, reclaiming the storage space of dead segments includes traversing the persistent LSRs to identify the containers having at least one dead segment. For each of the containers containing at least one dead segment, a copy-forward process is performed. During the copy-forward process, one or more segments that are not dead are copied from an original container to a new container. Thereafter, the original container is deleted to reclaim the storage space of the original container. Since the dead segments are indicated in the persistent LSRs in a persistent file, the copy-forward process can be performed in a separate process, such as off line.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, or a combination thereof.

Storage system 104 may include any type of server or cluster of servers. For example, storage system 104 may be a storage server used for any of various different purposes, such as to provide multiple users with access to shared data and/or to back up mission critical data. In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network.

In response to a data file to be stored in storage units 108-109, deduplication storage engine 107 is configured to segment the data file into multiple segment according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

According to one embodiment, storage software 105 includes a garbage collector or garbage collection logic 151 configured to perform a garbage collection process on data stored in storage units or devices 108-109 to reclaim any storage space of segments that have not been referenced or used by any file in the file system (e.g., dead segments). Segments of the files (e.g., data objects 112-113 and their respective metadata 110-111) may be compressed in one or more compression regions (CRs) and the CRs are then stored in containers within storage units 108-109. According to one embodiment, garbage collector 151 scans containers storing metadata 110-111 and data objects 112-113 to create LSRs 152 in the system memory. Garbage collector 152 determines whether each of the segments of containers in a set are live segments and populates the corresponding LSRs accordingly. Each of the LSR 152 storing information whether the associated segments are live segments. After all of the segments of the containers in the set have been scanned and their liveness have been populated in their respective LSRs, at least information concerning the liveness of the segments is then translated into persistent LSRs in persistent LSR files 161-162. Each persistent LSR record includes information indicating whether each of the segments contained in the corresponding container is a dead segment. Thereafter, the storage space of the dead segments that have been indicated in the persistent LSRs in LSR files 161-162 may be reclaimed, without having to scanning the containers again.

Figure 2:
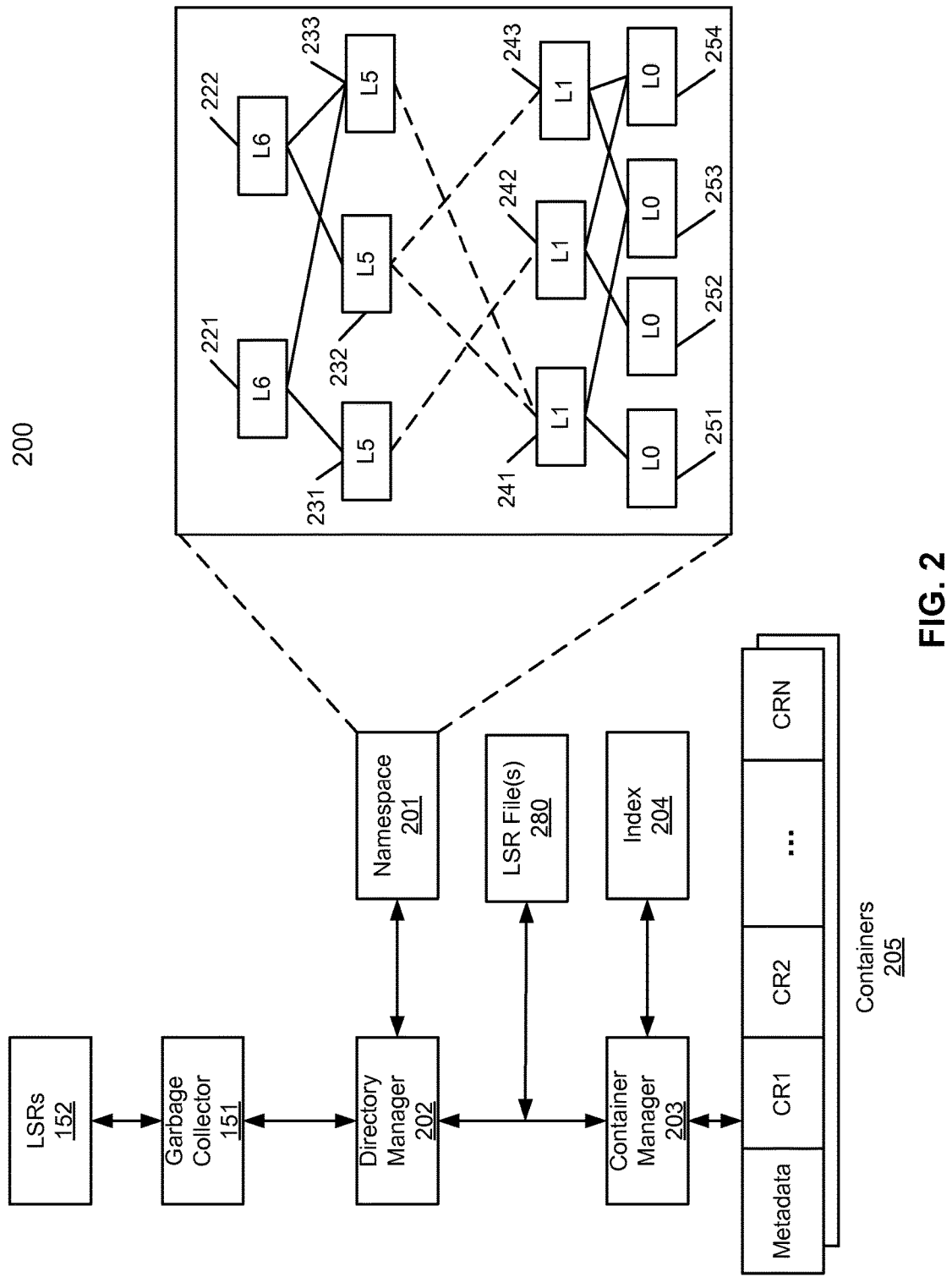
FIG. 2 is a block diagram illustrating a storage system according to one embodiment of the invention.

FIG. 2 is a block diagram illustrating a storage system according to one embodiment of the invention. System 200 may be implemented as part of storage system 104 of FIG. 1. Referring to FIG. 2, garbage collector 151 traverses namespace 201 via directory manager 202, where directory manager 202 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level (e.g., content or file handle). More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. Thus, L1 to L6 are segments only contain metadata of their respective child segments(s), referred to herein as Lp segments.

In one embodiment, when garbage collector 151 traverses namespace 201 via directory manager 202, it obtains the fingerprints of the root level segments, in this example, L6 segments, as part of content handles from namespace 201. Based on the fingerprints of the current level segments, container manager 203 can identify which of the containers 205 in which the segments are stored. In one embodiment, processing logic scans the container manager metadata (e.g., content type), which may be maintained in memory. For each segment of the type currently scanned for, the processing logic reads its metadata section, determines what CRs to read, and reads those CRs and process the segments therein. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 2, in this example, segment 221 includes a representation (e.g., fingerprint) of fingerprints of segments 231 and 233, and segment 222 includes a representation (e.g., a fingerprint) of fingerprints of segments 232-233, and so on. Some of the segments, such as segment 233, are referenced by multiple parent level segments (e.g., segments 221-222). Thus, segments 221-222, 231-233, and 241-243 only contain data representing the metadata of their respective child segments. Only segments 251-254 contain the actual user data. Any of segments that is not referenced by a parent segment is considered as a dead segment. Another word, if a segment is referenced by at least one other segment, the segment is considered as potentially a live segment.

In one embodiment, the set of containers 205 of storage system 200 is scanned by garbage collector 151, where each of the containers contain therein segments of data associated with one or more files of a file system of the storage system, which may be represented by file system namespace 201. The containers 205 may be scanned based on an order represented by container identifiers (IDs) to construct a list of container LSRs 152 in a system memory, where each of the container LSRs is identified by the corresponding container ID. For each of the segments contained in a container, a segment LSR is generated to be associated with or contained within the corresponding container LSR. Each segment LSR includes a level field storing a value representing a level of the segment within a corresponding file tree (e.g., namespace 201) and a live flag indicating whether the segment is a live segment. During the scanning, a level of each segment is determined and the level field of the corresponding segment LSR is populated.

After all of the segments in the set of containers have been populated in their respective segment LSRs, according to one embodiment, namespace 201 of the file system is traversed by garbage collector 151 to determine whether the segments of the containers in the set are live segments. The namespace 201 of the file system is traversed in a level-by-level manner based on the segment LSRs, for example, starting from the root level or top level (e.g., content handles or segments 221-222) and ending at the bottom level (e.g., segments 251-254). For the segments that are alive, live flags of their respective segment LSRs are configured or set for such indications.

After all of the segments associated with the set of containers have been traversed and indicated in their respective segment LSRs 152, according to one embodiment, at least the information of live flags of the segment LSRs 152 is then translated into the persistent LSRs stored in persistent LSR file 280 in a persistent storage device of the storage system. Each of the persistent LSRs in LSR file 280 corresponds to one of the containers in the set. Each persistent LSR includes a dead bitmap having multiple bits, each bit corresponding to one of the segments contained in the corresponding container. A bit having a predetermined logical value indicates the corresponding segment is a dead segment.

After all of the live flags of the segment LSRs have been translated into persistent LSRs and stored in persistent LSR file 280, according to one embodiment, the storage space of the dead segments indicated in the persistent LSRs is reclaimed, without having to scanning the containers again. In one embodiment, reclaiming the storage space of dead segments includes traversing the persistent LSRs to identify the containers having at least one dead segment. For each of the containers containing at least one dead segment, a copy-forward process is performed. During the copy-forward process, one or more segments that are not dead are copied from an original container to a new container. Thereafter, the original container is deleted to reclaim the storage space of the original container. Since the dead segments are indicated in the persistent LSRs in a persistent file, the copy-forward process can be performed in a separate process, such as off line.

Figure 3:
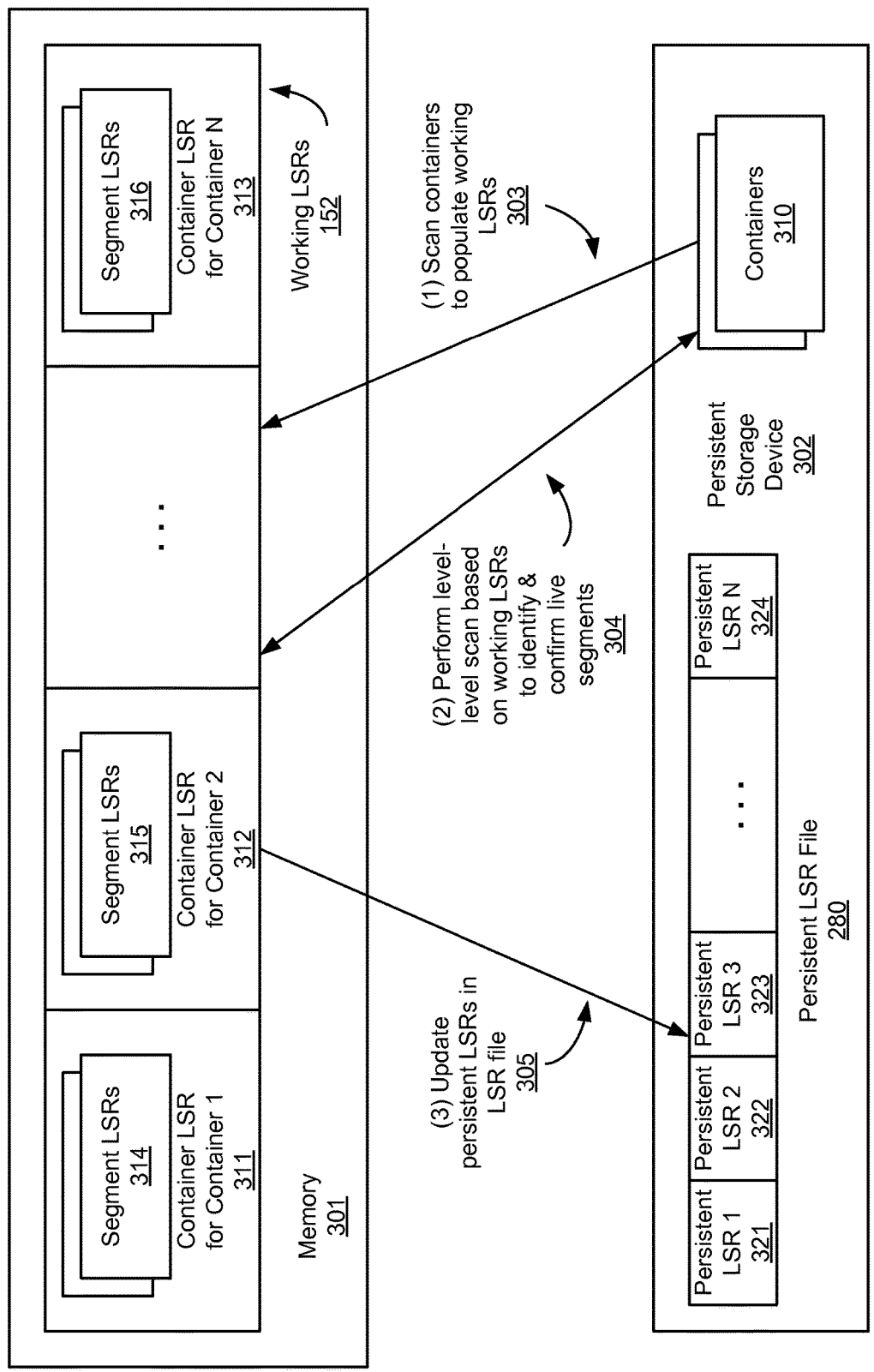
FIG. 3 is a block diagram illustrating a scanning process of a garbage collection operation of a storage system according to one embodiment of the invention.

FIG. 3 is a block diagram illustrating a scanning process of a garbage collection operation of a storage system according to one embodiment of the invention. The process as shown in FIG. 3 may be performed by processing logic such as garbage collector 151 of FIG. 2. Referring to FIG. 3, in response to a request for reclaiming storage space, processing logic scans, via path 303, a predetermined set of containers 310 (e.g., container candidates) to examine at least the metadata of the segments stored therein. Based on the scanning, a set of working LSRs 152 is generated and populated with information obtained from containers 310, for example, in system memory 301, where working LSRs 152 are also referred to as in-memory LSRs.

In one embodiment, working LSRs include a list of container LSRs 311-313, where each container LSR corresponds to one of the containers 310 stored in persistent storage device 302. Containers 310 may be scanned sequentially based on their respective container IDs. Similarly, container LSRs 311-313 may be created sequentially according to their respective container IDs. In one embodiment, each of container LSRs 311-313 includes one or more segment LSRs (e.g., segment LSRs 314-316), where each segment LSR corresponds to one of the segments contained in the respective container.

Figure 4:
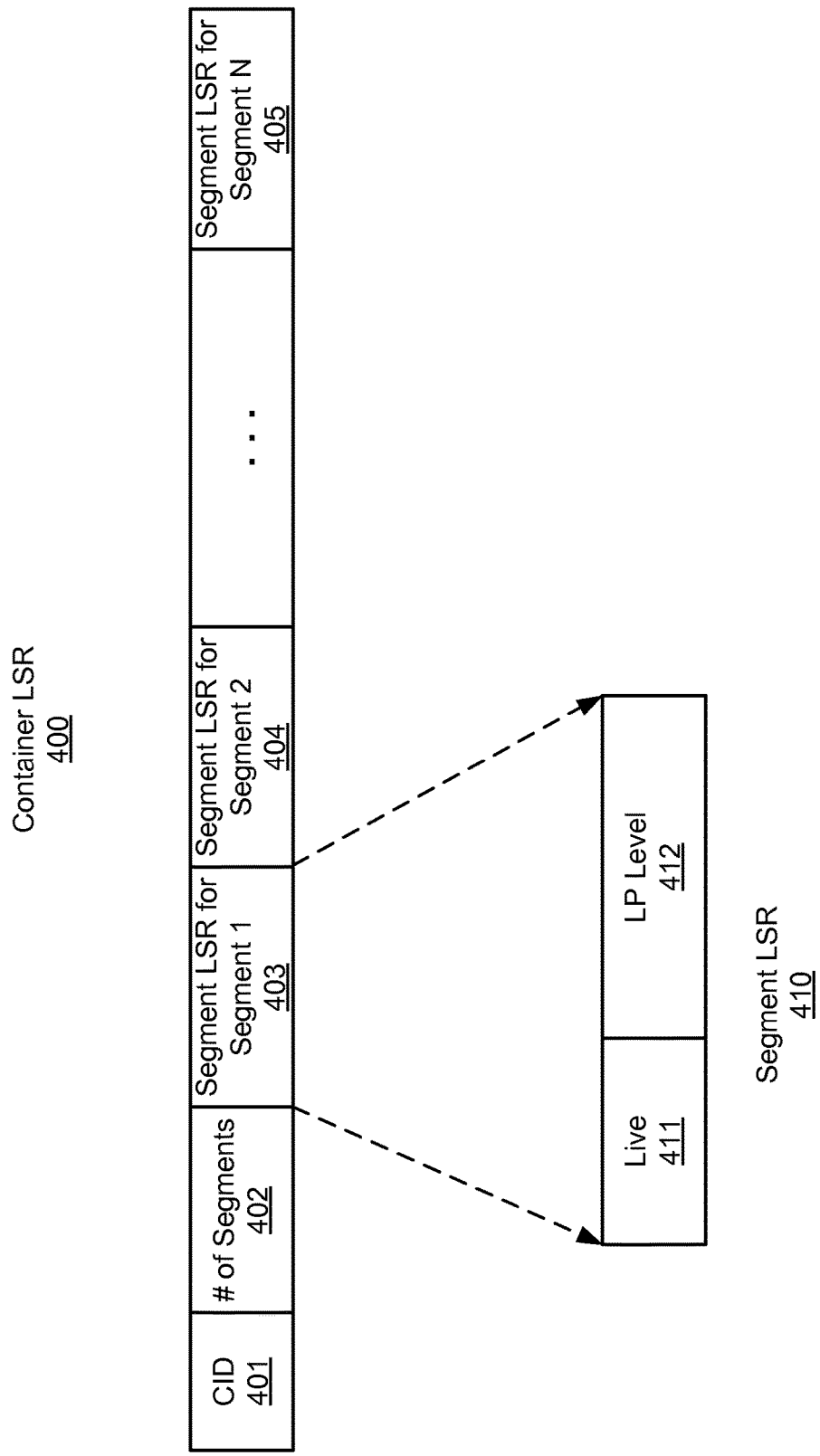
FIG. 4 is a block diagram illustrating an example of a working LSR according to one embodiment of the invention.

FIG. 4 is a block diagram illustrating an example of a working LSR according to one embodiment of the invention. Referring now to FIG. 4, container LSR 400 may represent any of the container LSRs 311-314 of FIG. 3. In this embodiment, container LSR 400 includes container ID (CID) 401 storing a container ID corresponding to the container LSR 400 represents, a number of segments 402 representing the number of segment LSRs 403-405, and the actual segment LSRs 403-405. Each of segment LSRs 403-405 may be presented by segment LSR 410 that includes live field 411 and level (e.g., LP level) of the segment 412 within an associated file tree. Live field 411 is used to store a value indicating whether the corresponding segment is a live segment. In one embodiment, live field 411 is a single bit field, where a predetermined logical value (e.g., TRUE) may indicate the segment is a live segment. Level 412 stores a value representing a level (e.g., L1-L6 of namespace 201 of FIG. 2) within a file tree. In one embodiment, level field 412 includes 3 bits storing a value representing one of the level.

Referring now to FIGS. 3 and 4, when processing logic, such as garbage collector 151, scans containers 310, it also determines the LP level of each segment from metadata obtained from containers 310. The LP level information is then written to level field 412 of the corresponding segment LSR. At this point live field or flag 411 is uninitiated since it is still unknown whether the segment is a live segment. In one embodiment, the LP level in level field 412 is represented by a distance from the top level, such as, a content handle, of the corresponding file tree. For example, an L6 segment would have a distance of 1, while an L5 segment would have a distance of 2, and so on. The recording of LP levels in working LSRs 152 is utilized subsequently for level-by-level traversal to determine which of the segments in the container set are live segments (e.g., referenced by at least one file of the file system).

After the segment LSRs 314-316 have been created and populated with level information in their respective level fields, according to one embodiment, the processing logic traverses the file system namespace in a level-by-level manner and verifies whether each of the segments in the file system namespace exists in any of containers 310, via path 304. In one embodiment, for each of the segments of a particular level (e.g., expected or wanted segments for a particular level), processing logic accesses containers 310 to verify whether those segments are currently stored in container 310. If a segment is found in any of containers 310, processing logic locates and accesses the corresponding segment LSR for the found segment, and sets the live flag (e.g., live flag or field 411 of FIG. 4) to a predetermined value or logical value indicating that the segment is a live segment. The above process is performed for each of the levels to populate the live flags of the segment LSRs.

According to one embodiment, each of level by level scan takes a vector as input. This can be a bloom filter or a perfect hash. The vector indicates what the matching fingerprints the processing logic needs to look for while scanning for this level. For first scan of the top level, L6 level, processing logic computes this vector by traversing the namespace and adding all L6 fingerprints it finds while doing so. For other levels (e.g., L5-L1), this vector is produced by reading the LP segments selected for processing in the current level and adding the child fingerprints to the vector. This vector is referred to as a wanted vector. While scanning the processing logic actually computes what fingerprints it actually finds. This is stored in another vector referred to as a found vector. Usually any fingerprints added to a wanted vector will also be added to a found vector unless there are missing LP segments. When the processing logic updates the found vector it also marks the corresponding segment as live in the corresponding segment LSR.

After all of the live segments found have been populated in their respective segment LSRs during the level-by-level traversal, according to one embodiment, at least the information of the live flags (e.g., live flag 411) of segment LSRs 314-316 is then translated and stored in their corresponding persistent LSRs 321-324 of persistent LSR file 280. Note that the entire working LSRs 152 may also be stored in the persistent storage as a separate LSR file. According to one embodiment, similar to working LSRs, persistent LSRs 321-324 may include segments LSRs corresponding to the segments contained in the corresponding container as shown in FIG. 4. Each segment LSR of the persistent LSR stores information indicating whether the corresponding segment is a dead segment, which may be translated from the live flag of the corresponding working segment LSR. Note that some or all of the information of the working LSRs, such as LP level information, can also be stored in their corresponding persistent LSRs.

Figure 5:
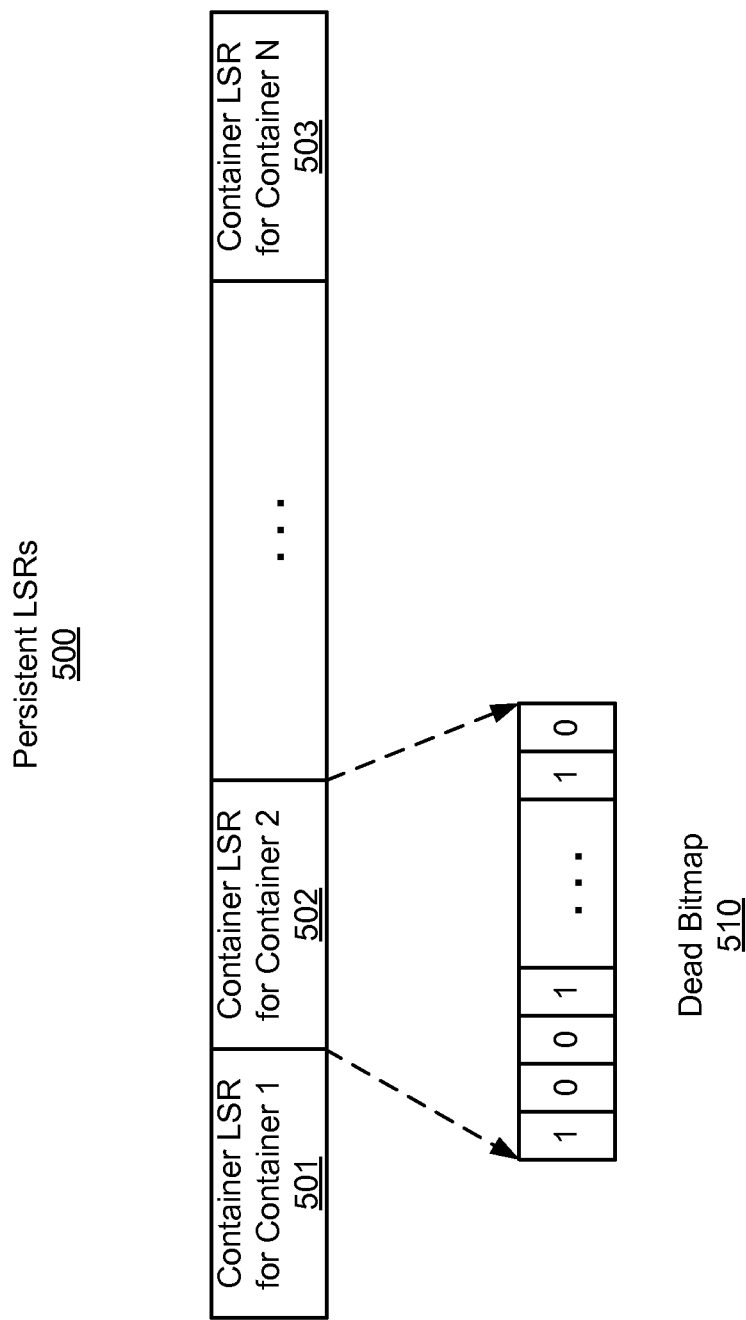
FIG. 5 is a block diagram illustrating an example of a persistent LSR according to one embodiment of the invention.

In one embodiment, as shown in FIG. 5, a persistent LSR corresponding to a container includes a dead bitmap or vector having series of bits. Each bit corresponds to one of the segments contained therein. A predetermined logical value (e.g., TRUE) of a bit indicates that the corresponding segment is a dead segment. Referring now to FIG. 5, persistent LSRs 500 may represent persistent LSRs 321-324 of FIG. 3, including container LSRs 501-503 corresponding to the containers represented by working LSRs 152 of FIG. 3. In this embodiment, the segment LSRs are represented by a bitmap or vector having a number of bits corresponding to the segments or segment LSRs. That is, a single bit is utilized to indicate whether a corresponding segment is a dead segment. For example, a logical value of TRUE may indicate that the corresponding segment is a dead segment. Note that each of container LSRs 501-503 may further include other information, such as a container ID and/or a number of segments or bits that are included therein, similar to those in the working LSRs described above. In the example as shown in FIG. 5, a single bit is utilized for indicating whether a segment is dead. However, for storing the segment LSR on file, per segment a few bits may be dedicated. For example, if n=4 bits are dedicated per segment then one container LSR will take n*m bits where m is number of segments in that container. For n=4, 1 bit can be used to denote "live", 3 bits can represent level of the segment. For the LSR file where n==1 only, each bit only indicates whether the segment is dead.

After all of the dead segments have been indicated in persistent LSRs 500, according to one embodiment, the storage space of the dead segments can be reclaimed based on the persistent LSRs, without having to scan the containers again. In one embodiment, the processing logic "walks" through the persistent LSRs 500 to identify any segments that have not been marked as dead segments. For those live segments, the processing logic copies the live segments from the original container to a new container. Thereafter, the original container is deleted to reclaim the associated storage space.

Figure 6:
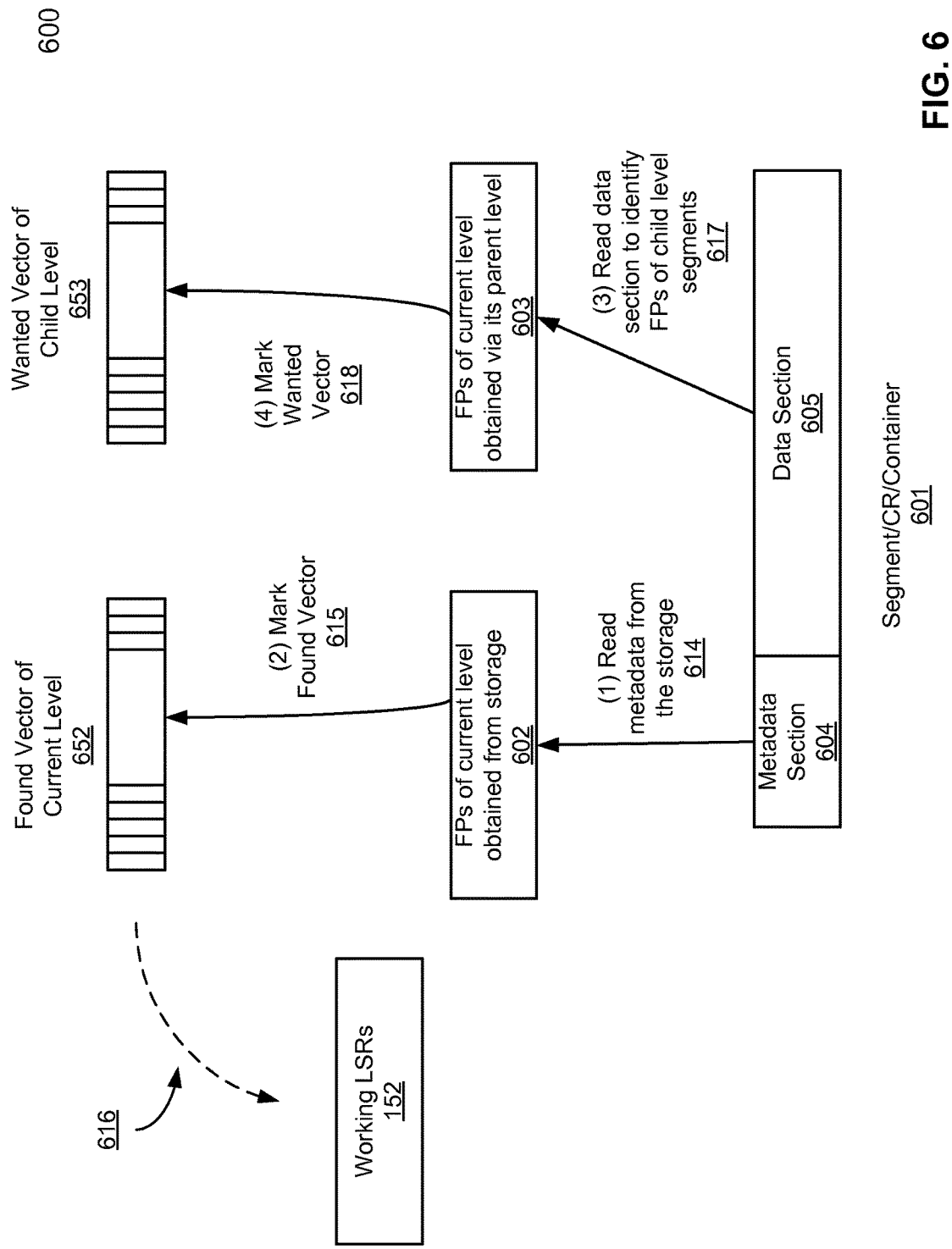
FIG. 6 is a flow process diagram illustrating an example of a level-by-level traversal to identify live segments according to one embodiment of the invention.

FIG. 6 is a flow process diagram illustrating an example of a level-by-level traversal to identify live segments according to one embodiment of the invention. Referring to FIG. 6, in this example, it is assumed that the working LSRs have been created and their level have been properly populated using some of the techniques described above. The traversal process starts from the root or top level of the file system namespace. For example initially processing logic identifies L6 segment from the corresponding working LSRs, for example, based on level fields 412 of the segment LSRs. Based on the fingerprint of the L6 segment, the processing logic accesses, via path 614, the associated containers to locate the L6 segment and reads its metadata section (e.g., metadata 604) from the container (e.g., container 601). Since the L6 segment has been found, the processing logic updates found vector 652 of the current level (e.g., L6 level) to indicate that the segment has been found (e.g., alive) via path 615. Note that, an L6 segment found may or may not be live. If an L6 segment is found in a wanted vector then it is live and it is "found" (as desired via wanted vector). In addition, the data section (e.g., data section 605) of the segment is read from the container via path 617, which becomes fingerprints 603 of their child segments (e.g., L5 segments). Based on fingerprints 603, wanted vector 653 of the child level is created via path 618 to indicate the child segments that should be examined in the next level (e.g., L5 level). In next child level, the above process is repeatedly performed based on the wanted vector of that child level, which has been populated during the scanning of its parent level.

After all of the levels (e.g., L6-L1) have been traversed and their found vectors have been populated, the live flags of the working LSRs 152 are then updated based on the found vectors of all levels via path 616. In one embodiment, the found vector 652 and wanted vector 653 may be implemented using a collision-less hash function (e.g., perfect hash function) or a bloom filter corresponding to that particular level. The hash function and/or the bloom filter for a particular level may be created based on the fingerprints of segments associated with that particular level, which may be created during the scanning of the containers.

A bloom filter is a space-efficient probabilistic data structure that is used to test whether an element is a member of a set. False positive retrieval results are possible, but false negatives are not; i.e. a query returns either "inside set (may be wrong)" or "definitely not in set". Elements can be added to the set, but not removed (though this can be addressed with a counting filter). The more elements that are added to the set, the larger the probability of false positives. A perfect hash function for a set S is a hash function that maps distinct elements in S to a set of integers, with no collisions. A perfect hash function has many of the same applications as other hash functions, but with the advantage that no collision resolution scheme has to be implemented.

According to one embodiment, a found vector and a wanted vector of a particular level can be used to identify any segments that are missing in that level. For example, the processing logic can compare the found vector and the wanted vector to identify any mismatch. A mismatched bit indicate the corresponding segment is missing. The missing segment can be recovered from a redundant storage. Furthermore, the level-by-level scanning process can be performed by multiple processes or threads substantially concurrently or in a pipeline manner, one process for one of the levels, to further improve the processing efficiency. In one embodiment, wanted and found vectors can be used this way only using perfect hash functions. For a bloom filter based approach, another vector, i.e., collision vector may be needed.

Figure 7:
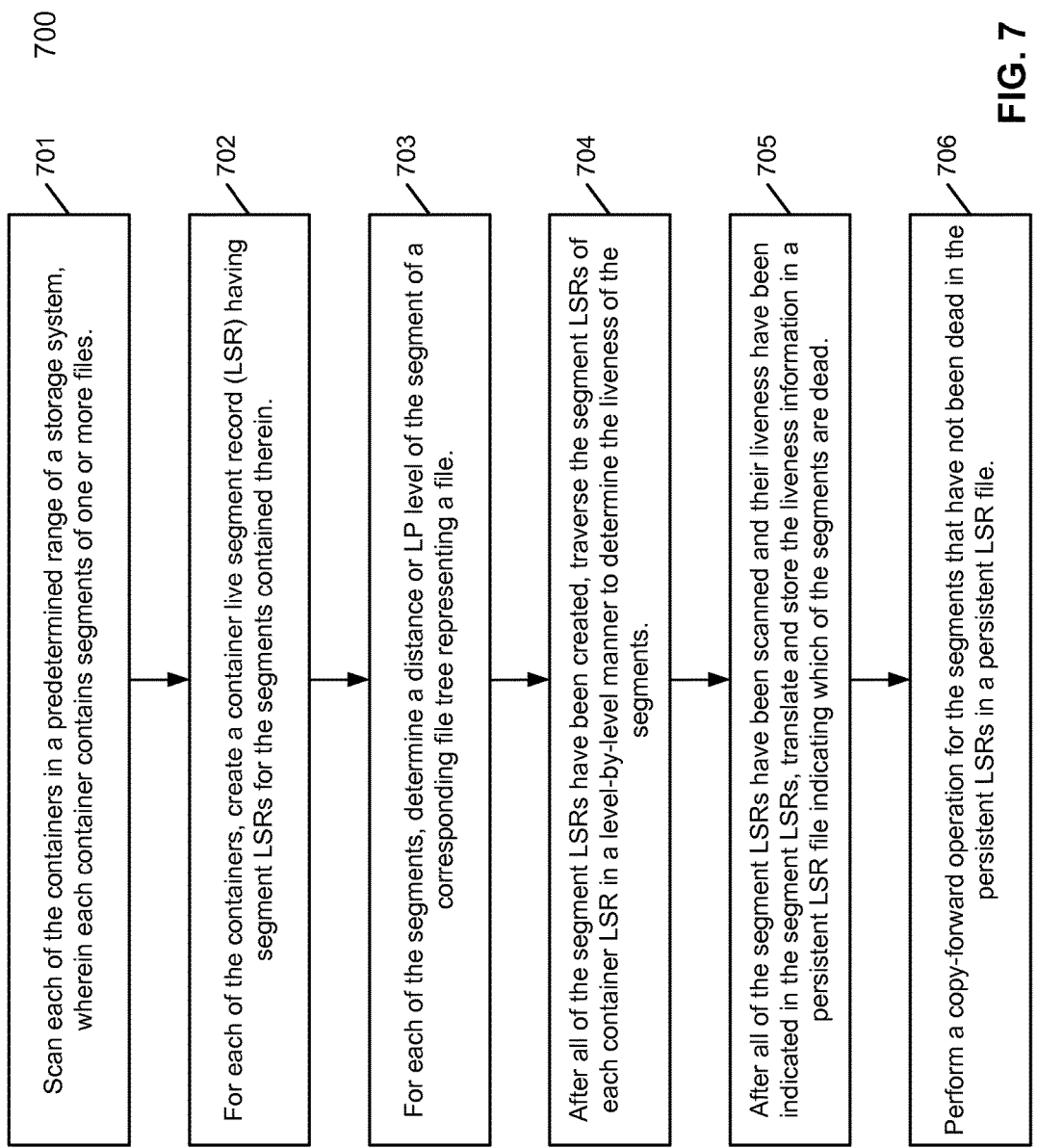
FIG. 7 is a flow diagram illustrating a process of performing garbage collection of a storage system using live segment records according to one embodiment of the invention.

FIG. 7 is a flow diagram illustrating a process of performing garbage collection of a storage system using live segment records according to one embodiment of the invention. Process 700 may be performed by processing logic that may include hardware, software, or a combination thereof. For example, process 700 may be performed by garbage collector 151 of FIG. 1. Referring to FIG. 7, at block 701, processing logic scans each of the containers in a predetermined range of a storage system, where each container contains segments of one or more files. For each of the containers, at block 702, a container LSR is created having a number of segment LSRs corresponding to the number of segments contained in the corresponding container. At block 703, for each of the segments scanned, processing logic determines a level (e.g., LP level) of the segment of a corresponding file tree representing a file.

After all of the segment LSRs have been created and populated, at block 704, processing logic traverses the segment LSRs of each container LSR in a level-by-level manner to determine the liveness of the segments. After the segment LSRs have been traversed, at block 705, at least the liveness of the segments of the segment LSRs is translated into persistent LSRs of an LSR file stored in a persistent storage device. The persistent LSRs include information indicating which of the segments are dead segments. Subsequently, at block 706, storage space of the dead segments is reclaimed based on the persistent LSRs, without having to scanning the containers again. In one embodiment, a copy-forward operation is performed to reclaim the storage space of the dead segments. For example, the processing logic "walks" through the persistent LSRs to identifying any container that has a dead segment. For each of the segments that are not dead, the segment is copied from the original container to a new container, and the original container is deleted thereafter.

Note that since the persistent LSRs have been stored in a persistent LSR file, the operations involved in blocks 701-705 and block 706 can be performed using separate processes or threads at different time. Alternatively, if the working LSRs are also cached in a persistent storage, the operations involved in blocks 701-703, blocks 704-705, as well as block 706 can be performed in separate processes or threads at different time.

Figure 8:
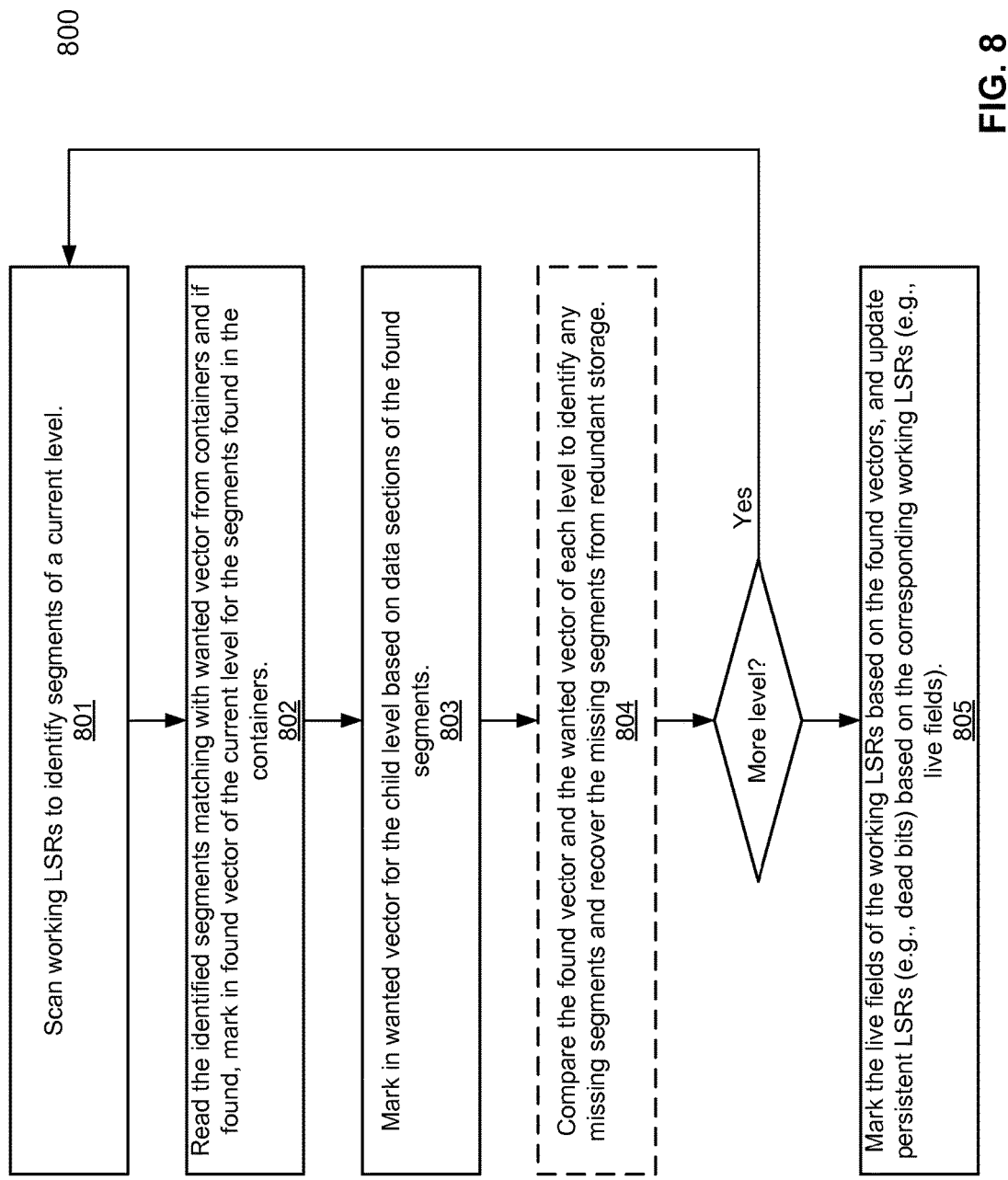
FIG. 8 is a flow diagram illustrating a process of performing garbage collection of a storage system using live segment records according to another embodiment of the invention.

FIG. 8 is a flow diagram illustrating a process of performing garbage collection of a storage system using live segment records according to one embodiment of the invention. Process 800 may be performed by processing logic that may include hardware, software, or a combination thereof. For example, process 800 may be performed by garbage collector 151 of FIG. 1. Specifically, process 800 may be performed as part of operations involved in block 704 of FIG. 7. Referring to FIG. 8, at block 801, processing logic scans the working LSRs (e.g., segment LSRs of each container LSR) to identify segments of the current level. The segments may be identified based on the level field of the corresponding segment LSRs. That is, only the segment LSRs that are associated with the current level (which is indicated by the level field of the corresponding segment LSRs) will be scanned and examined. At block 802, the identified segments that are found and matched with those in the found vector are read from the associated containers from the storage. If the segments are found in the storage, the found vector of the current level is marked for the found segments. In addition, at block 803, the data sections of the segments are examined to determine the child segments of the found segments. The wanted vector for the child level is updated for the child segments. Optionally, at block 804, the found vector and the wanted vector of each level are compared to identify any missing segments and if so, the missing segments may be recovered from a redundant storage. Again, the missing segments can be identified based on the wanted vector and the found vector only if they are implemented using a perfect hash function. If the vectors are implemented using bloom filters, another vector such as a collision vector may be needed. The above processes are iteratively performed for all of the levels. Once the found vectors have been marked for all levels, at block 805, the live flags or fields of the segment LSRs of the working LSRs are updated based on the segments indicated in the found vectors. In one embodiment, the processing logic updates persistent LSR (as a DEAD bit==1) from the corresponding working LSR (DEAD==TRUE if live==0 after all level by level scan), e.g., persistent_lsr{dead}=persistent_lsr{dead} bitwise_OR !working_lsr{live}).

FIGS. 9A-9M are flow diagrams illustrating a process of performing garbage collection of a storage system using live segment records according to some other embodiments of the invention. According to one embodiment, garbage collector or garbage collection logic 900, which may represent garbage collector 151, may include, but is not limited to, an LSR initialization module, a deduplicate fingerprint definition eliminator, an LP segment enumerator, an optional missing segment detector, an L0 segment enumerator, a persistent LSR dead bit updater, and a copy-forwarding module. These modules or units may be implemented as processing logic, which may include hardware, software, or a combination thereof.

Referring to FIG. 9A, in one embodiment, the LSR initialization module builds and initializes the LSRs at block 901, e.g., working LSRs 152, based on scanning of the corresponding containers. At block 902, the duplicate fingerprint definition eliminator eliminates or removes any duplicate fingerprint entries. For example, a fingerprint to container ID index may be sorted according to the fingerprint values and the duplicate entries having the same fingerprint may be removed. At block 903, the LP segment enumerator enumerate the LP segments, i.e., L6 to L1 segments except L0 segments. At block 904, missing segment detector optionally detects any missing segments during the LP segment numeration. At block 905, the L0 segment enumerator enumerate L0 segments. At block 906, the persistent LSR updater updates the dead bits in the persistent LSRs from the working LSRs. At block 907, the copy-forwarding module performs copy-forwarding operations for any segments that are not dead segments in the persistent LSRs. For example, the segments that are not dead are copied from an original container to a new container, and the storage space of the original container is then reclaimed.

Figure 9B:
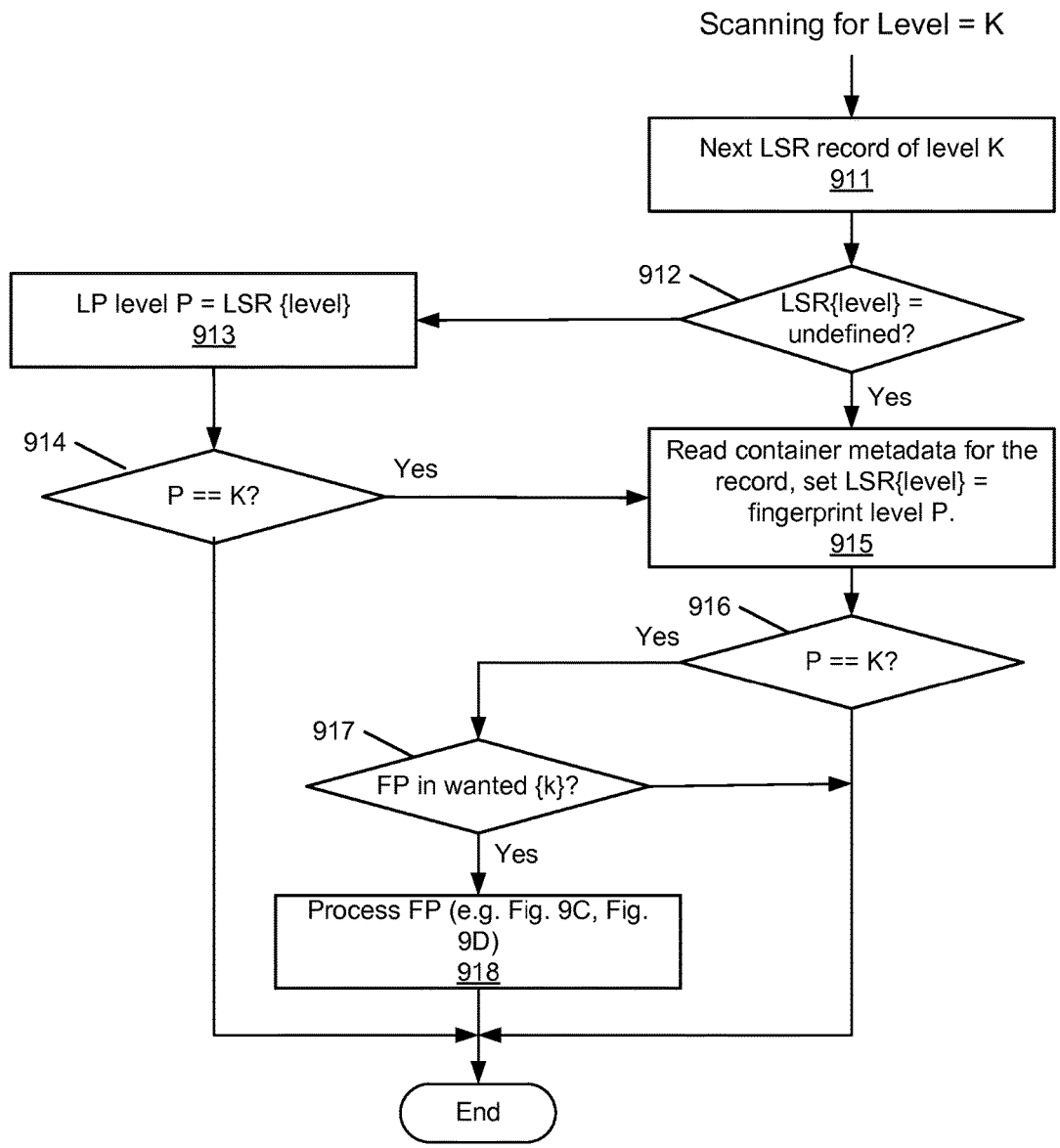

Referring now to FIG. 9B, FIG. 9B illustrates a process of performing scanning of a particular level, in this example, level K, during the LP segment enumeration process of block 903 of FIG. 9A. At block 911, a next LSR record (e.g., working LSR) is retrieved and at block 912, it is determined whether its LP level field has been populated or initialized (e.g., non-zero value). If the LP level field has not been initialized, at block 915, processing logic reads container metadata from the corresponding container, determines the LP level for the segment, and populates the LP field of the corresponding LSR. If the LP level of the LSR has already been specified at block 912, at block 913 and block 914, the processing logic checks whether the LP level from the LSR is the same as the current level (e.g., level K) and if so, the operations of block 915 are performed. At block 916, if the LP level read from the container is the same as the current level K, at block 917, processing logic checks whether the segment is one of the wanted segments, which has been populated in a wanted vector from its parent level. If so, at block 918, the fingerprint of the segment is processed.

Figure 9C:
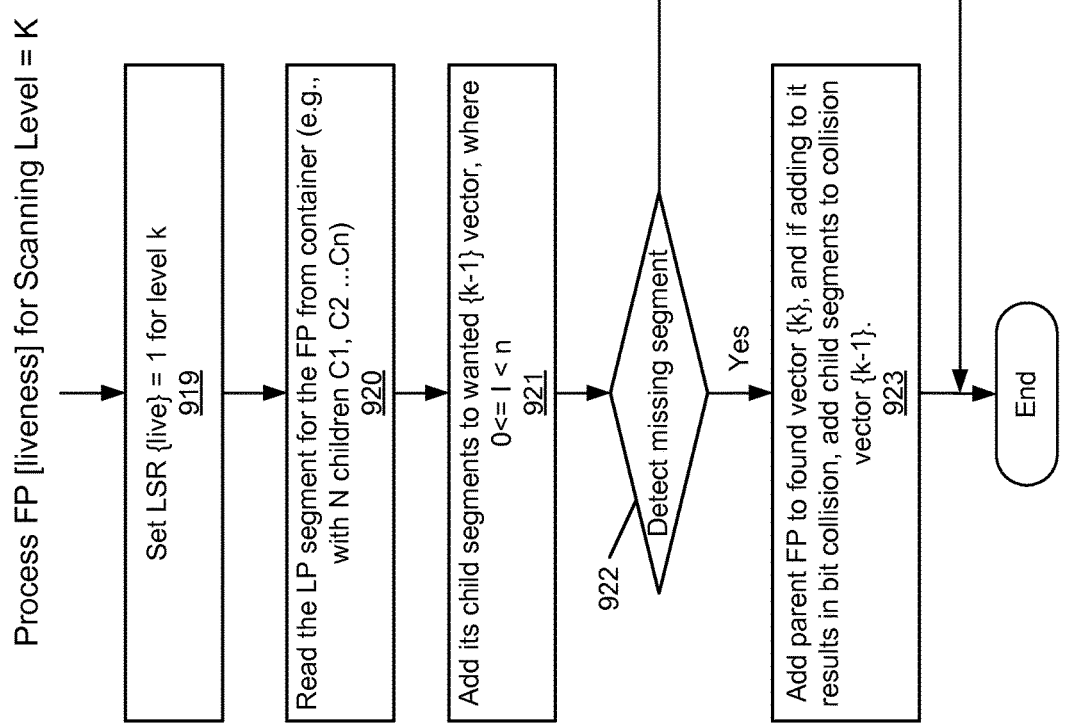

Referring now to FIG. 9C, which may be performed as part of block 918 of FIG. 9B, at block 919, the live field or bit of the LSR corresponding to the segment is set to a predetermined value (e.g., TRUE). At block 920, processing logic reads the data section of the segment from the container, where the data section of the segment contains fingerprints of its one or more child segments (e.g., C1, C2 ... Cn). At block 921, its child segments are added to the wanted vector (or bloom filter), for example, to be used by the next child level scanning. At block 922, processing logic optionally determines the missing segments, for example, by comparing the wanted vector of its parent level (e.g., level k+1) and the found vector of the current level (e.g., level k). If so, at block 923, parent FP is added to the found vector of the current level k, and if adding to the found vector of the current level k results in bit collision, the child FP or FPs are added to the collision vector of the child level {k−1}. The operations of FIGS. 9B-9C may be performed by an LP enumerator as part of block 903 of FIG. 9A.

Figure 9D:
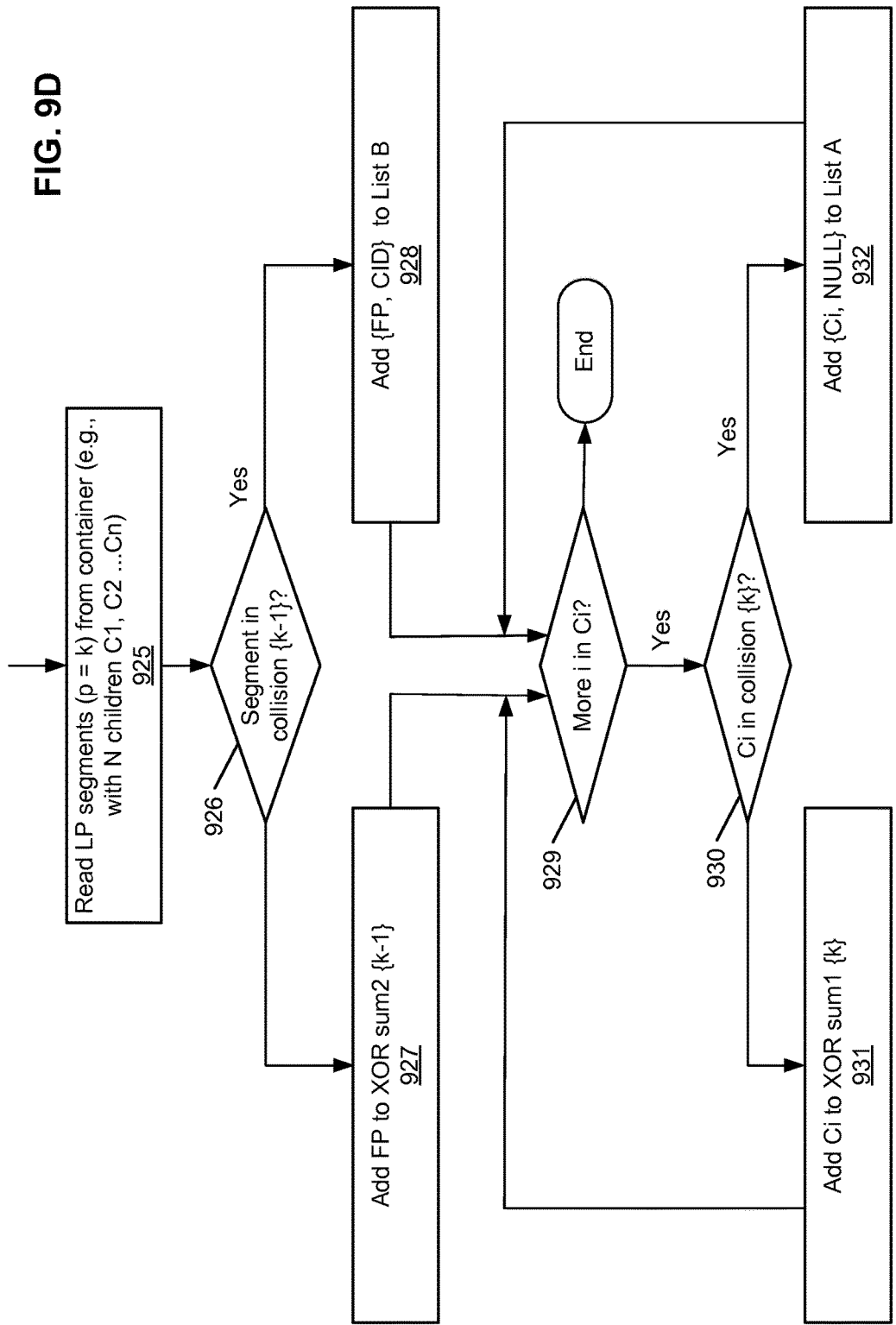

Continuing now to FIG. 9D, which may be performed as part of block 918 of FIG. 9B, at block 925, the LP segment is read from the container and is determined whether the segment is in the collision vector for level k−1 at block 926. If not, at block 927, the segment is added to XOR Sum2 vector for level k−1; otherwise, the {FP, CID} for the segment is added to List B at block 928. If there are more child segments at block 929 and these child segments are part of collision vector at block 930, the child segments are added to List A as uninitialized data at block 932; otherwise, the child segments are added to XOR Sum1 vector for the current level at block 931. If there is no more child segments at block 929, the process ends or moves to a next phase.

Figure 9E:
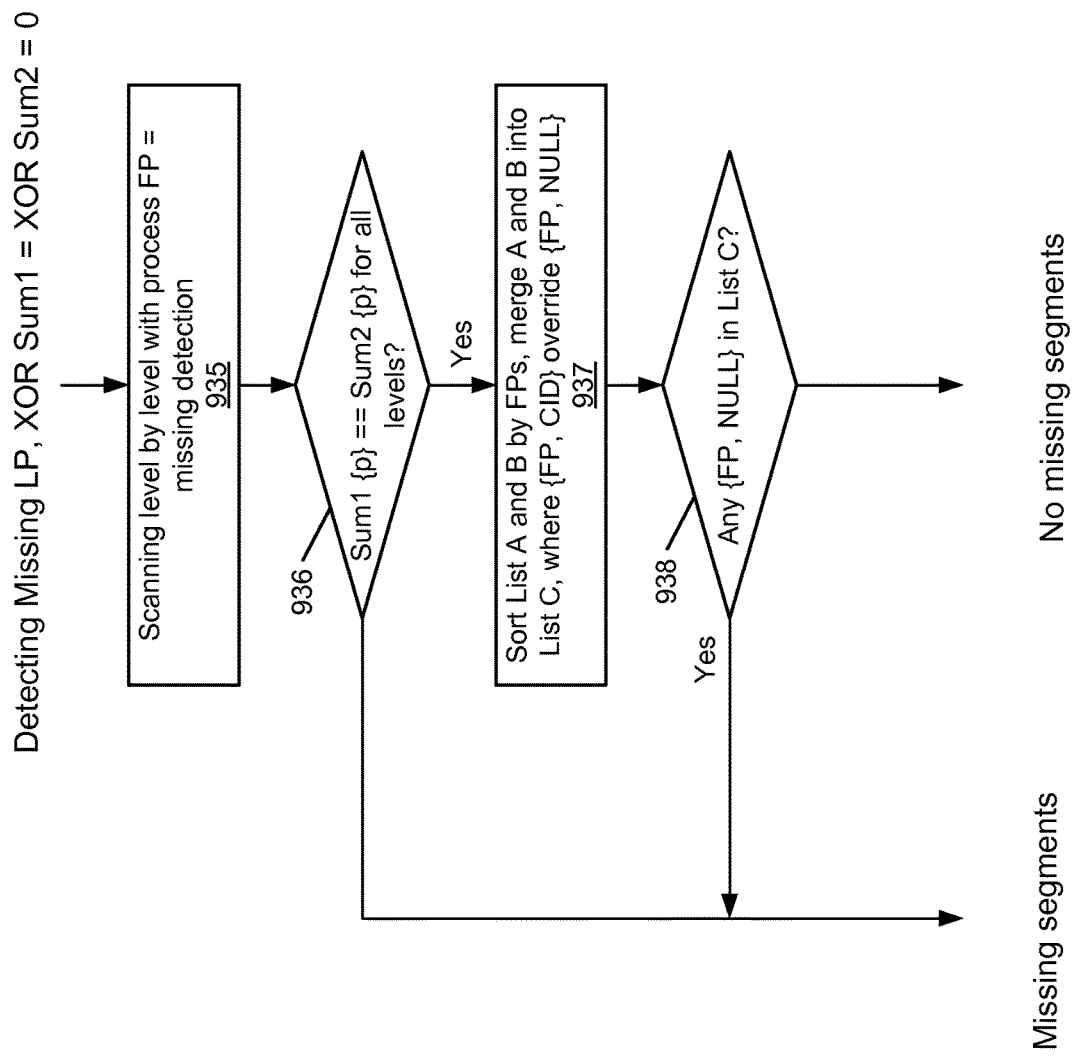

Continuing now to FIG. 9E as block 935 as performed in block 904 of FIG. 9A, at block 936, it is determined Sum1 and Sum2 match for all levels. If not, there is at least one missing segment; otherwise at block 937, the list A and list B are sorted and merged into list C, where {FP, CID} will override {FP, NULL}. At block 938, it is determined whether there is any {FP, NULL} in list C. If so, there is at least one missing segment; otherwise, there is no missing segment. The operations involved in FIGS. 9D-9E may be performed by a missing segment detector as part of operations performed at block 904 of FIG. 9A.

Figure 9F:
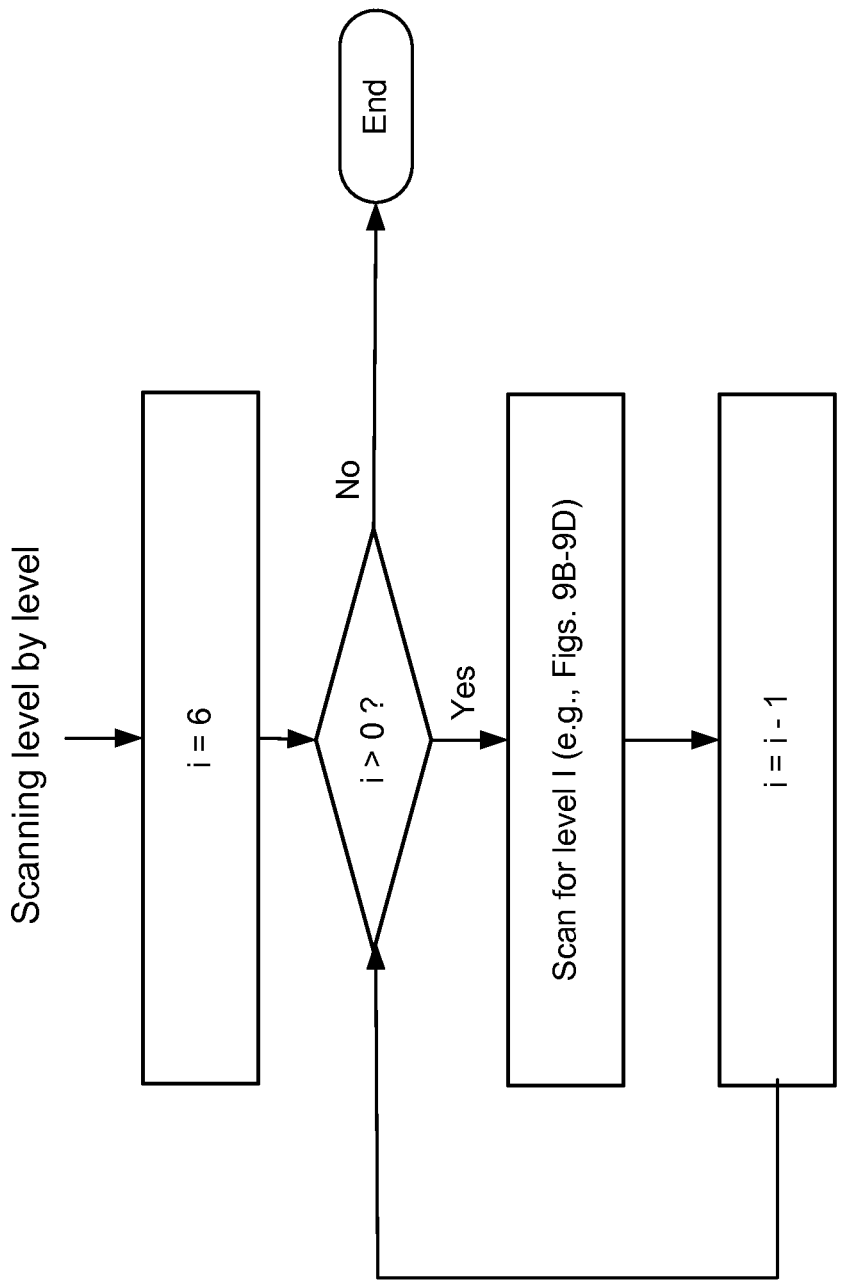

FIG. 9F is a high level flow diagram defining an LP enumerator (e.g., LP enumerator 903 in FIG. 9A) covering the operations as shown in FIGS. 9B-9E. Note that in this example with L0 to L6 architecture, wanted vector for L6 is populated by scanning the namespace, while the wanted vector for L0 is not used. The LP enumerator can be used to find liveness and then another enumerator for detecting missing segments during the enumeration. These enumerators can operate in a pipelined manner. When the first enumerator works on level K, the second enumerator can work on level K+1, e.g., running behind one step. In one embodiment, the operations of block 904 of FIG. 9A can be represented by the process of FIG. 9F followed by the process of FIG. 9E.

Figure 9G:
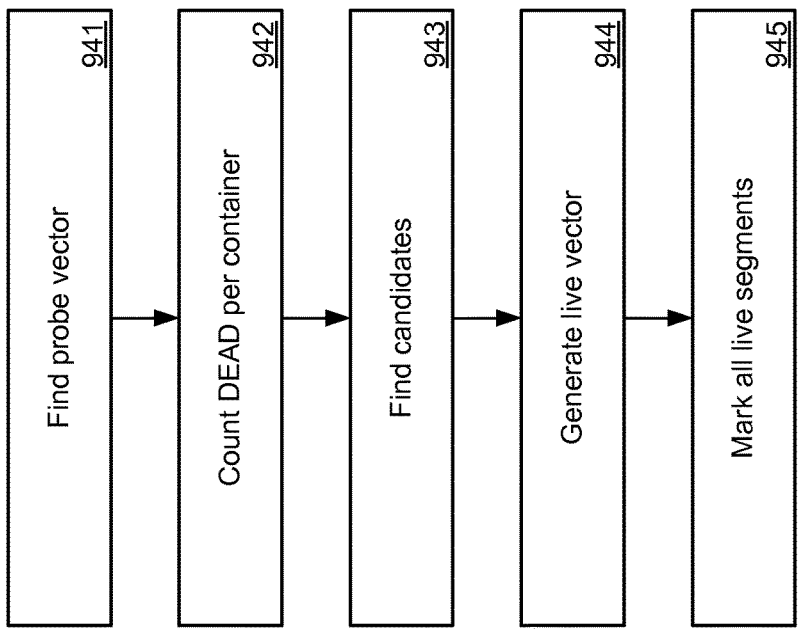

FIGS. 9G-9L are flow diagrams illustrating an example of an L0 enumeration process, which may be performed by an L0 enumerator as part of block 905 of FIG. 9A. Referring to FIG. 9G, this processing flow represents a high level L0 segment enumeration process. Although the L0 enumerator and the LP enumerator can be implemented as a single enumerator, given the typically large number of L0 segments, it may be better to maintain a separate L0 enumerator to be more memory friendly. During the L0 enumeration, a probing technique is utilized. In one embodiment, a set of container is selected and the processing logic tries to find which ones of the fingerprints (L0) are actually alive. It then picks the dead LSRs ranging in this list of containers and marks the dead bits to indicate accordingly. FIG. 9G shows a high level of an L0 enumeration process according to one embodiment. Referring to FIG. 9G, the process includes finding probe vector 941, counting dead segments per container 942, finding candidates 943, generating a live vector 944, and marking all live segments 945.

Figure 9H:
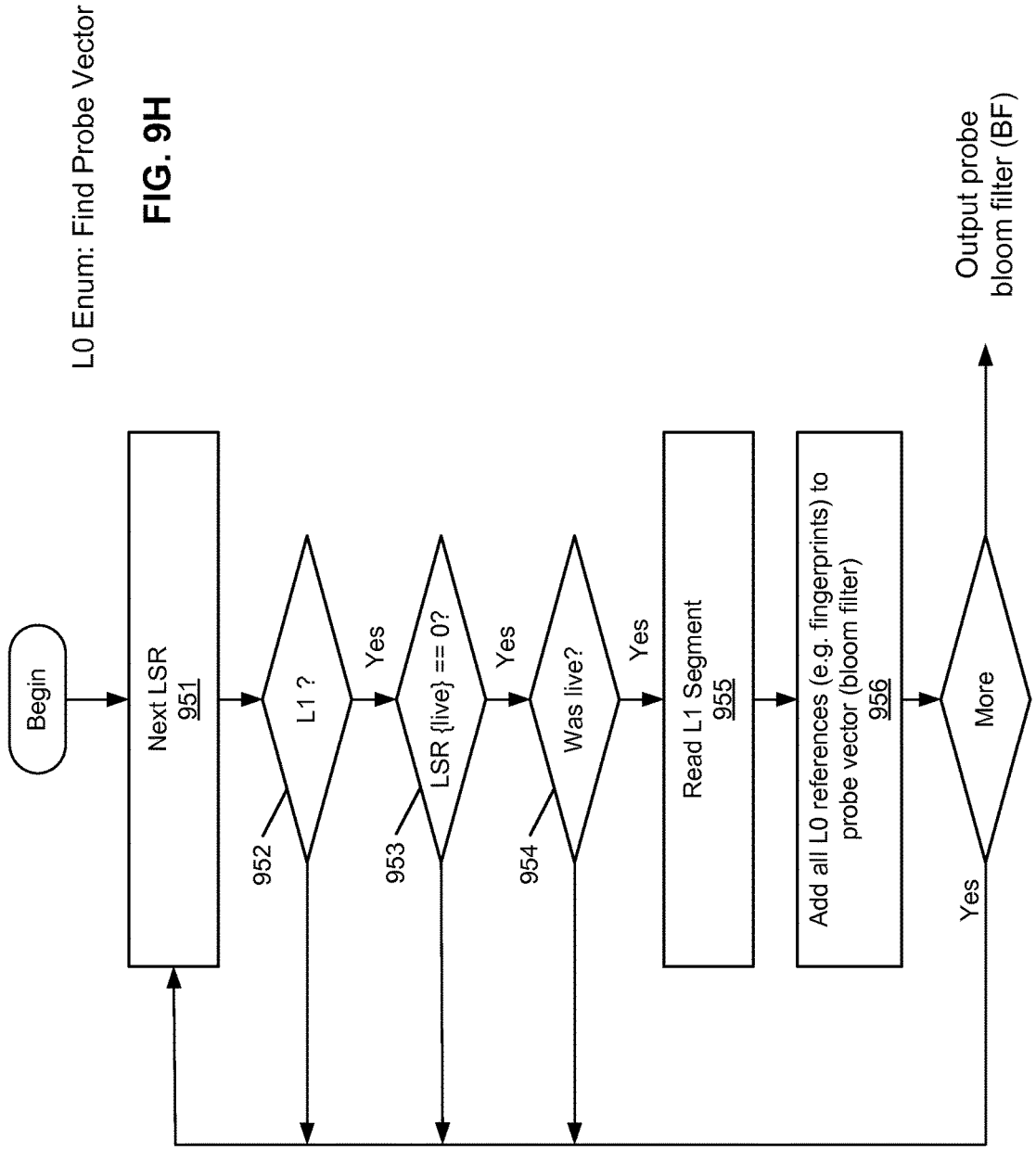

FIG. 9H is a flow diagram illustrating a process as part of operations involved in block 941 of FIG. 9G according to one embodiment. Referring to FIG. 9H, at block 951, a next LSR is retrieved and at block 952, it is determined whether the LSR is associated with L1. If not, the current LSR is skipped and a next LSR is processed. Otherwise at block 953, processing logic determines whether the live field or bit of the LSR has not been set to indicate whether the segment is a live segment. If so, at block 954, processing logic determines whether the segment was alive. For example, it can access the corresponding persistent LSR to determine whether the segment has already been marked dead. If the segment was alive (e.g., the dead bit not set), at block 955, the processing logic reads the L1 segments associated with the current L0 segment in question. At block 956, the L0 references (e.g., fingerprints of the child L0 segments) are then added into the probe vector. The above process is iteratively performed for each of the LSRs.

Figure 9I:
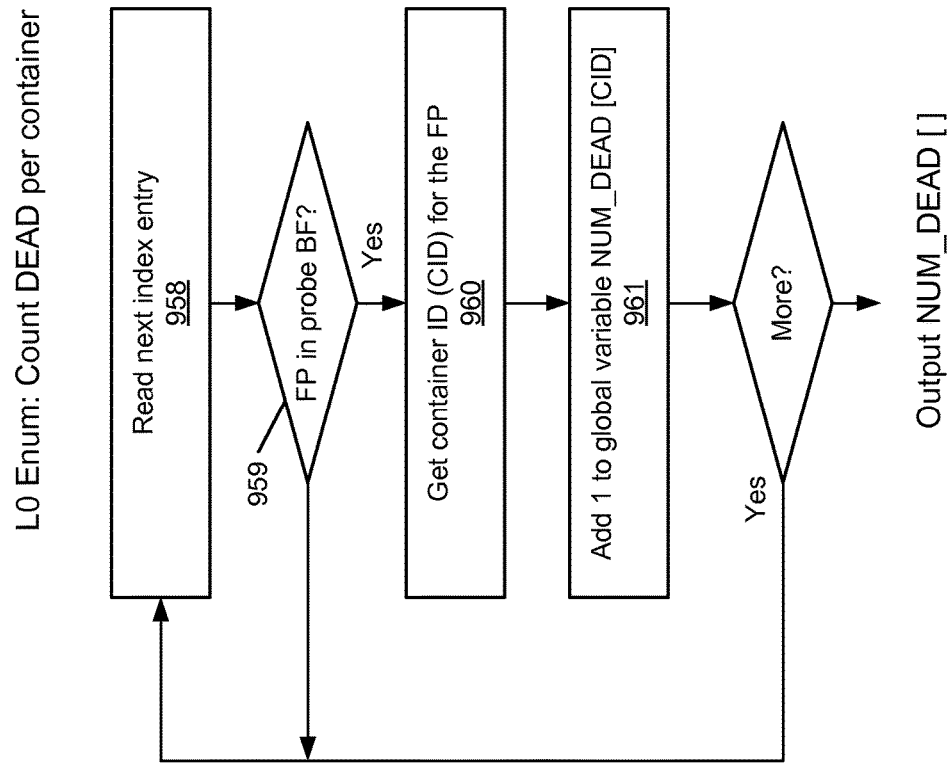

FIG. 9I is a flow diagram illustrating a process as part of operations involved in block 942 of FIG. 9G according to one embodiment. In this embodiment, an array of counters is utilized, one for each of the containers. The processing logic traverses the index entries to identifying any entry matching those in the probe vector or bloom filter. For those matched, the counters for the containers are incremented. The counters indicate how many dead fingerprints that might have been found. Higher the count, higher the possibility that the container contains dead segments. Referring to FIG. 9I, at block 958, the processing logic traverses the index (e.g., fingerprint to container ID index) to retrieve a next index entry. At block 959, processing logic determines whether the fingerprint of the index entry is in the probe vector or bloom filter. If so, at block 960, the processing logic obtains the corresponding container ID from the index entry and increments the corresponding entry in the counter array at block 961. The above process is iteratively performed for all of the index entries.

FIG. 9J is a flow diagram illustrating a process as part of operations involved in block 943 of FIG. 9G according to one embodiment. Referring to FIG. 9J, at block 964, some of the containers having a dead counter value that is greater than a predetermined threshold (e.g., non-zero) are selected. At block 965, the container IDs of the selected containers are added to a list of container IDs, CID_list. At block 966, the metadata of the containers in the list is read from the corresponding containers. The fingerprints of the containers are then added to the container candidate vector.

Figure 9K:
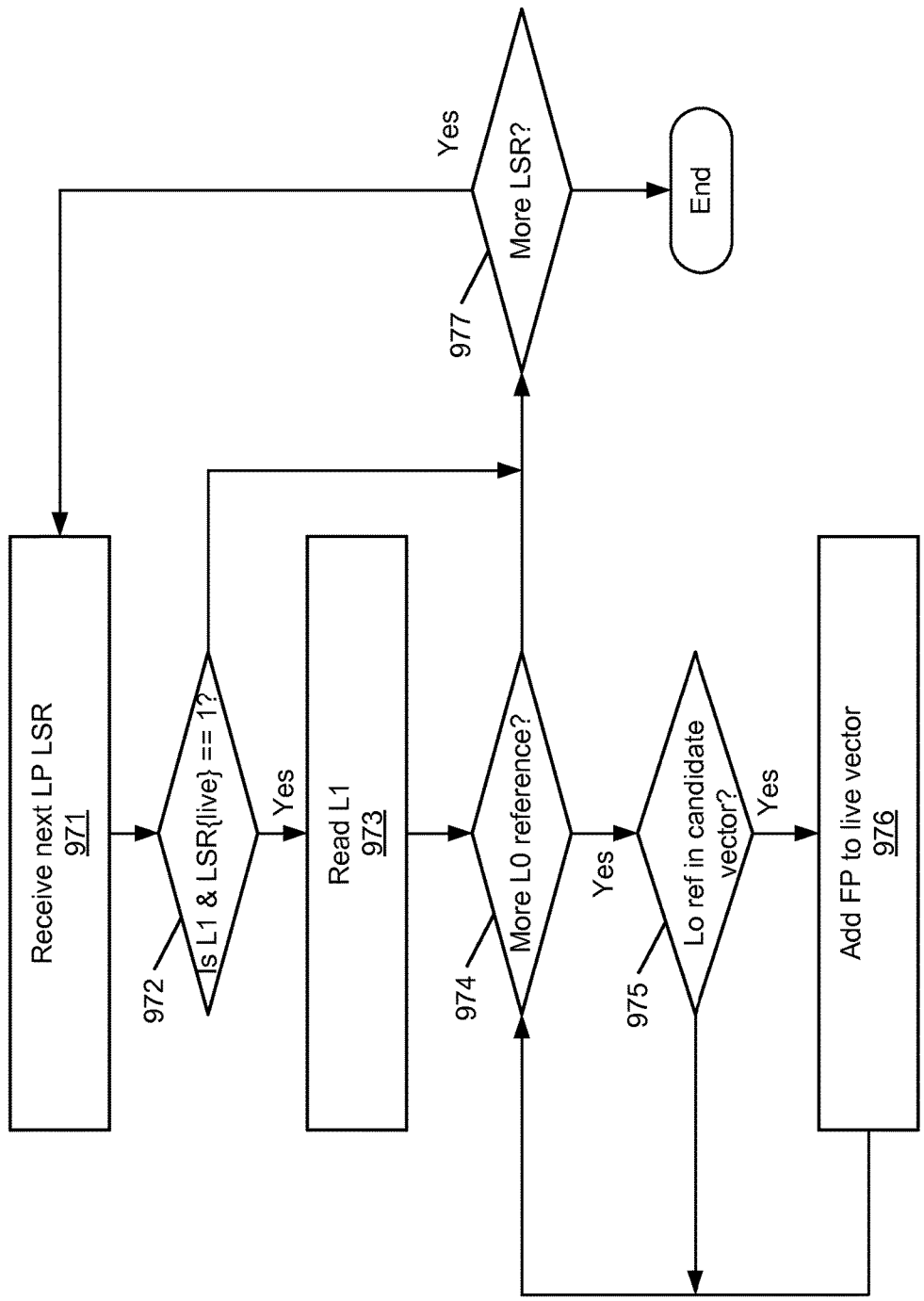

FIG. 9K is a flow diagram illustrating a process as part of operations involved in block 944 of FIG. 9G according to one embodiment. In this embodiment, the processing logic scans all L1 segments that are alive (e.g., by examining live field of the corresponding LSRs). If there is any fingerprint references of the L1 segments in the candidate vector, the fingerprints of those segments will be added to the live vector. Referring to FIG. 9K, at block 971, a next LSR is retrieved. At block 972, processing logic determines whether it is an L1 segment and whether it is a live segment. If so, the L1 segment is read from the corresponding container at block 973. The L0 references of the L1 segment are examined at blocks 974 and 975 to determine whether the L0 references are in the candidate vector. Any L0 reference that is in the candidate vector is then added to the live vector at block 976. At block 977, the processing logic determines whether there are more LSRs to process. If so, the above operations are iteratively performed for all LSRs.

Figure 9L:
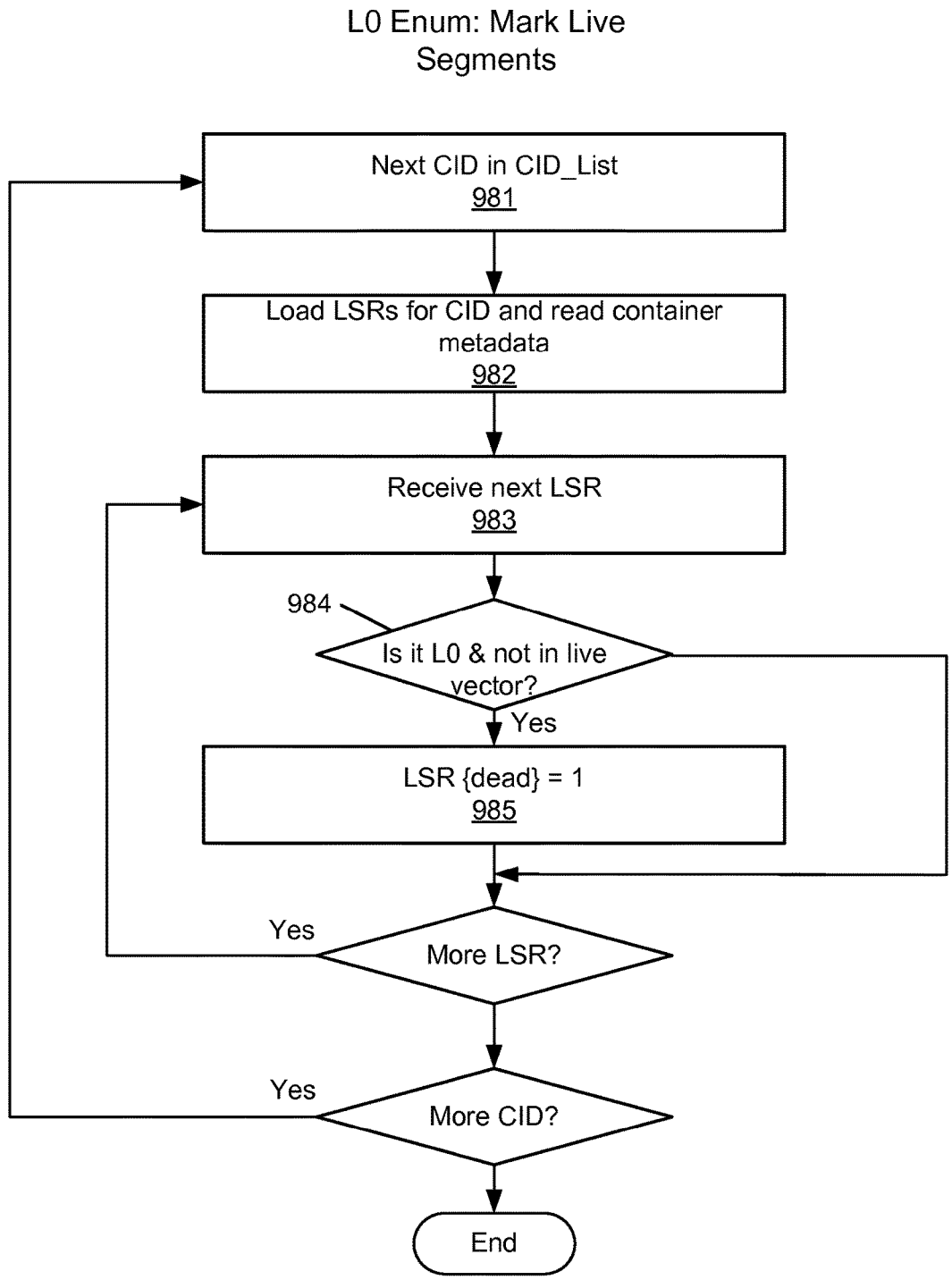

FIG. 9L is a flow diagram illustrating a process as part of operations involved in block 945 of FIG. 9G according to one embodiment. In this embodiment, the persistent LSRs in the persistent LSR file are utilized. The persistent LSRs for all the containers in the container list are loaded. The dead bits or fields of the segments that are not in the live vector are updated in the persistent LSRs. Referring to FIG. 9L, at block 981, a container ID is obtained from the list of containers identified above in FIG. 9K. At block 982, the LSRs of the container identified by the container ID are loaded and the metadata of the container is read from the container. At block 982, a next LSR is examined and at block 984, processing logic determines whether the segment of the LSR is an L0 segment and whether the segment is not in the live vector. If so, at block 985, its dead bit or field in the LSR is updated to indicate that the segment is a dead segment. The above process is iteratively performed for all of the LSRs of all of the containers identified in the container ID list.

Figure 9M:
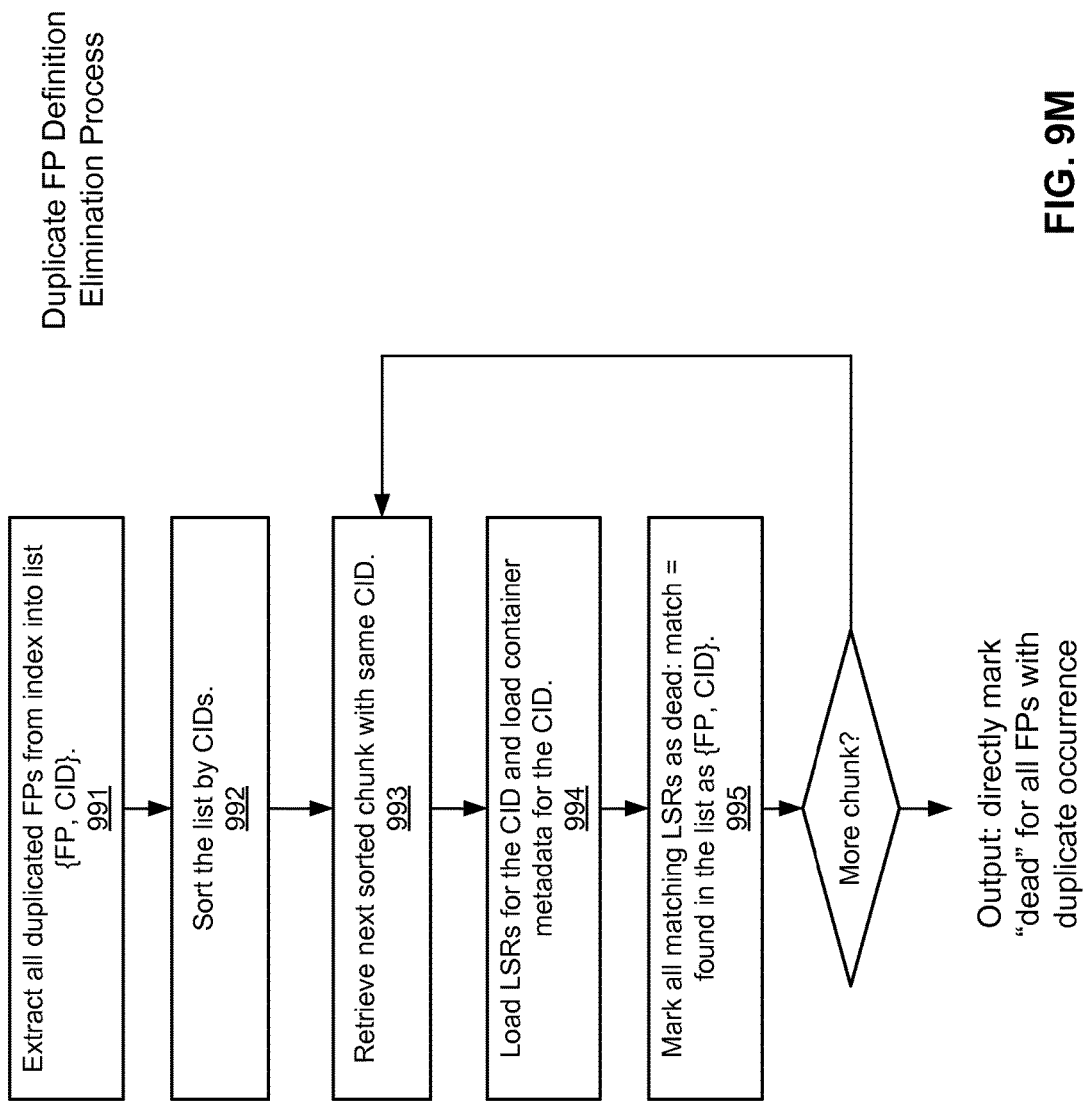

FIG. 9M is a flow diagram illustrating a process as part of operations involved in block 902 of FIG. 9A according to one embodiment. FIG. 9M shows a process for marking all duplicate definition of the same segments (L0 or LP) as dead. In this embodiment, the processing logic scans the index for duplicate entries of the same fingerprints. When multiple entries of the same fingerprint are detected, the {fingerprint, CID} pairs are recorded in a list. The list is then sorted based on the container ID so that those fingerprints are now available in the LSR record order. The duplicated entries with the same fingerprints can be identified based on the sorted entries. The dead bits or fields of the persistent LSRs can be directly updated to indicate that the duplicated segments are dead segments. Referring to FIG. 9M, at block 991, processing logic extracts all the duplicate fingerprints from the index into a list of {fingerprint, CID} pairs. At block 992, the list is sorted based on the container IDs. At block 993, a next sorted chunk with the same container ID is retrieved and at block 994, the corresponding LSR for the chunk is loaded, as well as its corresponding container metadata. At block 995, all the matching LSRs are marked in their respective dead bits as dead segments. The above process is iteratively performed for all chunks. Finally, the duplicated segments are marked dead.

Note that the LP segment numeration processes, such as those described in blocks 903 and 904 of FIG. 9A, can be performed in a pipelined manner (e.g., via multiple processes or threads). Without pipelined, there may be multiple LP segment numeration. At block 904 of FIG. 9A, a full enumeration is performed and then operations of FIG. 9E are performed. The process described in FIG. 9F represents an LP enumeration process of block 903. FIG. 9B is related to scanning for particular level=i. The process of FIG. 9D is related to operations involved in block 918 of FIG. 9B.

Figure 10:
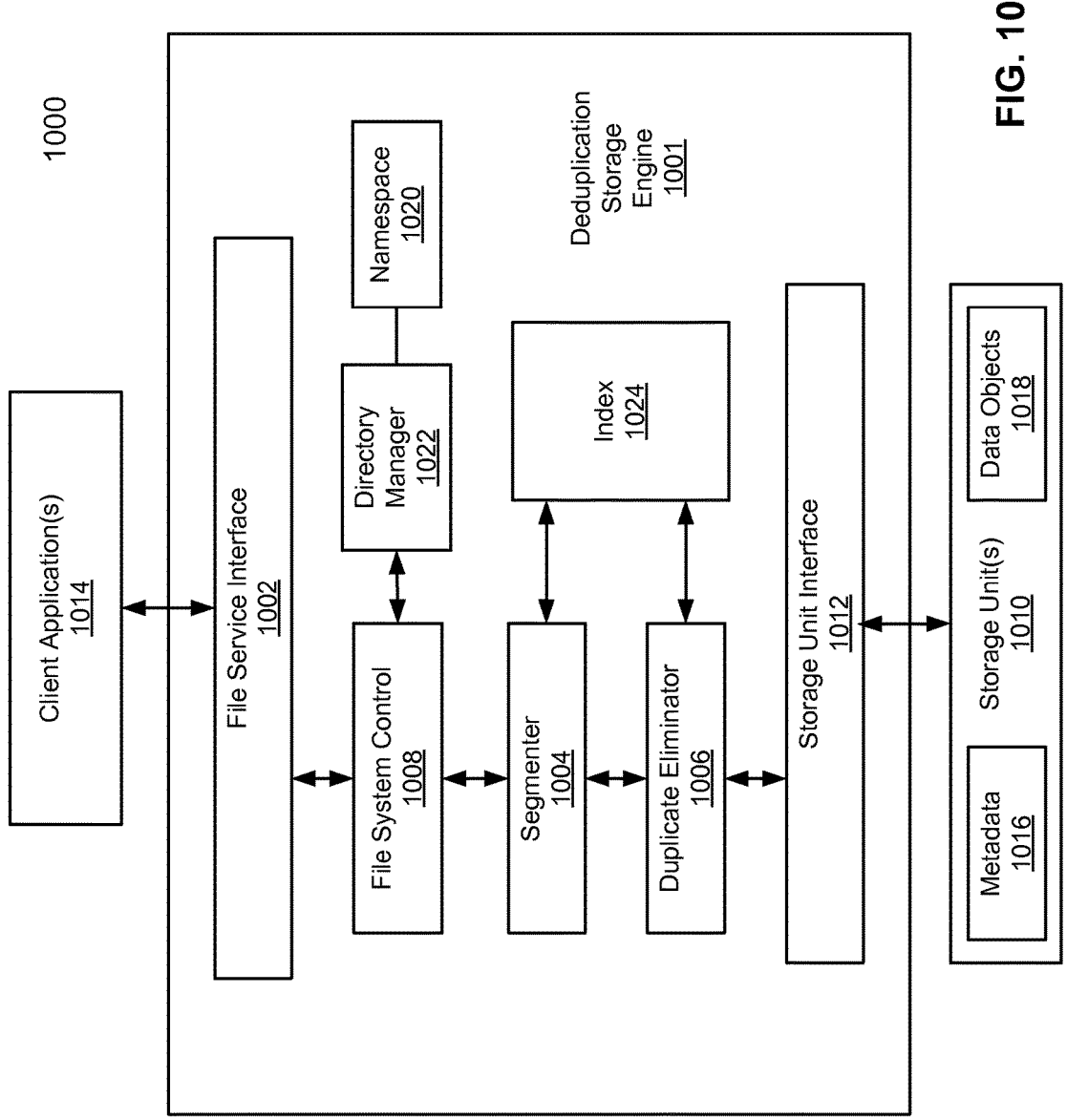
FIG. 10 is a block diagram illustrating a deduplicated storage system according to one embodiment of the invention.

FIG. 10 is a block diagram illustrating a deduplication storage system according to one embodiment of the invention. For example, deduplication storage system 1000 may be implemented as part of a deduplication storage system as described above, such as, for example, the deduplication storage system as shown in FIG. 1. In one embodiment, storage system 1000 may represent a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network. In one embodiment, one of storage units 1010 operates as an active storage to receive and store external or fresh user data, while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFF-MAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data segment, a compression region (CR) of data segments, or a container of one or more CRs. Fingerprints are mapped to a particular data object via metadata 1016, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit identifier identifying a storage unit in which the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, deduplication storage engine 1001 includes file service interface 1002, segmenter 1004, duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008, also referred to as a file system manager, processes information to indicate the segment(s) association with a file. In some embodiments, a list of fingerprints is used to indicate segment(s) associated with a file. File system control 1008 passes segment association information (e.g., representative data such as a fingerprint) to index 1024. Index 1024 is used to locate stored segments in storage units 1010 via storage unit interface 1012. Duplicate eliminator 1006, also referred to as a segment store, identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (which may be implemented as part of storage unit interface 1012) into one or more storage containers stored in storage units 1010. The deduplicated segments may be further compressed into one or more CRs using a variation of compression algorithms, such as a Lempel-Ziv algorithm before being stored. A container may contains one or more CRs and each CR may contain one or more deduplicated segments. A container may further contain the metadata such as fingerprints, type of the data segments, etc. that are associated with the data segments stored therein.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates (e.g., via segmenter 1004) with index 1024 to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree obtained from namespace 1020) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software (such as is run on a general-purpose computer system or a dedicated machine), hardware (e.g., dedicated logic, circuitry, processing device, processor, etc.), or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for garbage collection of a storage system, the method comprising:
   scanning, by a garbage collector executed by a processor, a plurality of containers of a storage system, each container containing a plurality of segments referenced by a plurality of files in a file system of the storage system;
   for each of the containers being scanned constructing a working live segment record (LSR) file in memory, including
      generating a container LSR for each of the containers being scanned in a sequential order according to container identifiers (ID) of the containers,
      generating a plurality of segment LSRs associated with the container LSR, each of the segment LSRs corresponding to one of the plurality of segments contained in the container, and
      for each of the segments contained in the container, indicating in a corresponding segment LSR whether the segment is a live segment; and
   translating the segment LSRs of each container LSR of the working LSR file from the memory into a persistent LSR for each of the containers in a persistent LSR file stored in a persistent storage, wherein each of the persistent LSR includes information indicating whether each of the segments contained therein is dead, and wherein a storage space of one or more dead segments indicated in each of the persistent LSR is subsequently reclaimed based on the persistent LSRs of the persistent LSR file without scanning the containers again.

2. The method of claim 1, wherein the segments referenced by the files are deduplicated segments contained in one or more containers stored in the persistent storage, and wherein at least a portion of the segments are shared by a plurality of files in the file system.

3. The method of claim 2, wherein each of the persistent LSRs corresponds to one of the containers, and wherein each of the persistent LSRs includes a container ID uniquely identifying a corresponding container.

4. The method of claim 3, wherein each of the persistent LSRs includes a dead bitmap having a plurality of bits, each corresponding to one of the segments contained in a corresponding container, and wherein a predetermined logical value of a bit in the dead bitmap indicates that a corresponding segment is dead and not referenced by any of the files in the file system.

5. The method of claim 1, wherein each of the container LSRs of the working LSR file includes a container ID identifying one of the containers in the storage system, a number of segments contained in the container, and a plurality of segment LSRs corresponding to the segments contained therein.

6. The method of claim 5, wherein each of the segment LSRs includes a live flag storing a logical value indicating whether the corresponding segment is alive and referenced by any one of the files in the storage system.

7. The method of claim 6, wherein each of the files in the storage system is represented by a file tree having a plurality of segments in a plurality of levels of a hierarchical structure, and wherein each segment of a parent level references zero or more child segments of a child level.

8. The method of claim 7, wherein each of the segment LSRs further includes a level field storing a level number indicating a level of which the corresponding segment belongs in a corresponding file tree.

9. The method of claim 8, further comprising performing a level-by-level scanning of the segment LSRs in the working LSR file based on the level fields of the segment LSRs to determine whether the segment is referenced by any of the files in the storage system, and wherein if a segment is referenced by a file, setting a live flag of a segment LSR corresponding to the segment to the predetermined logical value.

10. A non-transitory machine-readable medium having instructions stored therein, which when executed by a processor, cause the processor to perform operations for garbage collection of a storage system, the operations comprising:
   scanning, by a garbage collector executed by a processor, a plurality of containers of a storage system, each container containing a plurality of segments referenced by a plurality of files in a file system of the storage system;
   for each of the containers being scanned constructing a working live segment record (LSR) file in memory, including
      generating a container LSR for each of the containers being scanned in a sequential order according to container identifiers (ID) of the containers,
      generating a plurality of segment LSRs associated with the container LSR, each of the segment LSRs corresponding to one of the plurality of segments contained in the container, and
      for each of the segments contained in the container, indicating in a corresponding segment LSR whether the segment is a live segment; and
   translating the segment LSRs of each container LSR of the working LSR file from the memory into a persistent LSR for each of the containers in a persistent LSR file stored in a persistent storage, wherein each of the persistent LSR includes information indicating whether each of the segments contained therein is dead, and wherein a storage space of one or more dead segments indicated in each of the persistent LSR is subsequently reclaimed based on the persistent LSRs of the persistent LSR file without scanning the containers again.

11. The non-transitory machine-readable medium of claim 10, wherein the segments referenced by the files are deduplicated segments contained in one or more containers stored in the persistent storage, and wherein at least a portion of the segments are shared by a plurality of files in the file system.

12. The non-transitory machine-readable medium of claim 11, wherein each of the persistent LSRs corresponds to one of the containers, and wherein each of the persistent LSRs includes a container ID uniquely identifying a corresponding container.

13. The non-transitory machine-readable medium of claim 12, wherein each of the persistent LSRs includes a dead bitmap having a plurality of bits, each corresponding to one of the segments contained in a corresponding container, and wherein a predetermined logical value of a bit in the dead bitmap indicates that a corresponding segment is dead and not referenced by any of the files in the file system.

14. The non-transitory machine-readable medium of claim 10, wherein each of the container LSRs of the working LSR file includes a container ID identifying one of the containers in the storage system, a number of segments contained in the container, and a plurality of segment LSRs corresponding to the segments contained therein.

15. The non-transitory machine-readable medium of claim 14, wherein each of the segment LSRs includes a live flag storing a logical value indicating whether the corresponding segment is alive and referenced by any one of the files in the storage system.

16. The non-transitory machine-readable medium of claim 15, wherein each of the files in the storage system is represented by a file tree having a plurality of segments in a plurality of levels of a hierarchical structure, and wherein each segment of a parent level references zero or more child segments of a child level.

17. The non-transitory machine-readable medium of claim 16, wherein each of the segment LSRs further includes a level field storing a level number indicating a level of which the corresponding segment belongs in a corresponding file tree.

18. The non-transitory machine-readable medium of claim 17, wherein the operations further comprise performing a level-by-level scanning of the segment LSRs in the working LSR file based on the level fields of the segment LSRs to determine whether the segment is referenced by any of the files in the storage system, and wherein if a segment is referenced by a file, setting a live flag of a segment LSR corresponding to the segment to the predetermined logical value.

19. A storage system, comprising:
a processor;
a memory coupled to the processor; and
a garbage collector executed in the memory by the processor to perform operations, the operations comprising
scanning a plurality of containers of a storage system, each container containing a plurality of segments referenced by a plurality of files in a file system of the storage system,
for each of the containers being scanned constructing a working live segment record (LSR) file in memory, including
generating a container LSR for each of the containers being scanned in a sequential order according to container identifiers (ID) of the containers,
generating a plurality of segment LSRs associated with the container LSR, each of the segment LSRs corresponding to one of the plurality of segments contained in the container, and
for each of the segments contained in the container, indicating in a corresponding segment LSR whether the segment is a live segment, and
translating the segment LSRs of each container LSR of the working LSR file from the memory into a persistent LSR for each of the containers in a persistent LSR file stored in a persistent storage, wherein each of the persistent LSR includes information indicating whether each of the segments contained therein is dead, and wherein a storage space of one or more dead segments indicated in each of the persistent LSR is subsequently reclaimed based on the persistent LSRs of the persistent LSR file without scanning the containers again.

20. The storage system of claim 19, wherein the segments referenced by the files are deduplicated segments contained in one or more containers stored in the persistent storage, and wherein at least a portion of the segments are shared by a plurality of files in the file system.

21. The storage system of claim 20, wherein each of the persistent LSRs corresponds to one of the containers, and wherein each of the persistent LSRs includes a container ID uniquely identifying a corresponding container.

22. The storage system of claim 21, wherein each of the persistent LSRs includes a dead bitmap having a plurality of bits, each corresponding to one of the segments contained in a corresponding container, and wherein a predetermined logical value of a bit in the dead bitmap indicates that a corresponding segment is dead and not referenced by any of the files in the file system.

23. The storage system of claim 19, wherein each of the container LSRs of the working LSR file includes a container ID identifying one of the containers in the storage system, a number of segments contained in the container, and a plurality of segment LSRs corresponding to the segments contained therein.

24. The storage system of claim 23, wherein each of the segment LSRs includes a live flag storing a logical value indicating whether the corresponding segment is alive and referenced by any one of the files in the storage system.

* * * * *